United States Patent [19]

Takano et al.

[11] Patent Number: 5,347,623
[45] Date of Patent: Sep. 13, 1994

[54] INFORMATION RETRIEVAL APPARATUS WITH USER INTERFACE FOR DISPLAYING AND PRINTING OF RETRIEVED DATA IN DIFFERENT SELECTED SEQUENCES

[75] Inventors: Sakuharu Takano; Sumio Kita, both of Nara, Japan

[73] Assignee: Sharp Kabushiki Kaisha, Osaka, Japan

[21] Appl. No.: 263,557

[22] Filed: Oct. 27, 1988

[30] Foreign Application Priority Data

| Oct. 29, 1987 | [JP] | Japan | 62-274172 |
| Oct. 31, 1987 | [JP] | Japan | 62-276571 |
| Oct. 31, 1987 | [JP] | Japan | 62-276572 |
| Oct. 31, 1987 | [JP] | Japan | 62-276573 |
| Oct. 31, 1987 | [JP] | Japan | 62-276575 |
| Oct. 31, 1987 | [JP] | Japan | 62-276576 |
| Oct. 31, 1987 | [JP] | Japan | 62-276577 |
| Oct. 31, 1987 | [JP] | Japan | 62-276578 |

[51] Int. Cl.$^5$ ............................................. G06F 15/40
[52] U.S. Cl. ............................... 395/157; 395/600;
364/DIG. 2; 364/927.2; 364/927.63; 364/974.6
[58] Field of Search ... 364/200 MS File, 900 MS File,
364/DIG. 1, DIG. 2; 395/100, 118, 155, 157,
600

[56] References Cited

U.S. PATENT DOCUMENTS

| 4,574,364 | 3/1986 | Tabata et al. | 364/900 |
| 4,811,416 | 3/1989 | Nakamura | 382/61 |
| 4,866,535 | 9/1989 | Kubota et al. | 358/474 |
| 4,878,250 | 10/1989 | Kotera et al. | 382/56 |
| 4,879,648 | 11/1989 | Cochran et al. | 364/300 |
| 4,954,819 | 9/1990 | Watkins | 340/721 |
| 4,964,039 | 10/1990 | Izawa et al. | 364/200 |
| 4,965,763 | 10/1990 | Zamora | 364/900 |

FOREIGN PATENT DOCUMENTS 0130050 1/1985 European Pat. Off. .
0220386 5/1987 European Pat. Off. .

OTHER PUBLICATIONS

*APS Text Search & Retrieval Manual,* Planning Research Corp., Jun. 1988, Chapters 4.3–4.5, 5.3 and 6.1–6.3.
*APS Classified Search & Image Retrieval Manual,* Planning Research Corp., May 29, 1990, Chapters 5, 8 and 9.
"Data Base Management for HP Precision Architecture Computers" by A. S. Brown et al. in *Hewlett–Packard Journal,* vol. 37, No. 12, pp. 33–48.
"Domain/Delphi: Retrieving Documents Online" by P. Orwick et al., Proceedings of the CHI'86 Conference, Apr. 1986, pp. 114–121.

Primary Examiner—Thomas C. Lee
Assistant Examiner—Maria N. Von Buhr

[57] ABSTRACT

An information retrieval apparatus having a CPU which causes retrieval conditions entered through an input device to be stored in a memory together with titles entered through the input device. The CPU also calls titles of the retrieval conditions stored in the memory to cause a list of the titles to be displayed on a display unit, so that required titles can be selected from the title list for retrieval condition setting.

4 Claims, 23 Drawing Sheets

INFORMATION RETRIEVAL APPARATUS WITH USER INTERFACE FOR DISPLAYING AND PRINTING OF RETRIEVED DATA IN DIFFERENT SELECTED SEQUENCES

BACKGROUND OF THE INVENTION

The present invention relates to an information retrieval apparatus for retrieving, on the basis of retrieval conditions, primary information registered together with such secondary information which can provide the retrieval conditions when retrieval is required.

A conventional retrieval apparatus of this type includes a CPU (central processing unit), a register unit for entry of primary information together with relevant secondary information, an input device for inputting data such as retrieval conditions, etc., and a display unit which displays a list or the like of pieces of secondary information searched on the basis of retrieval conditions inputted by the input device and which performs the following steps of retrieval operation according to a flow chart as shown in FIG. 22.

At step S1, initialization is executed for the display of lists, etc.

At step S2, retrieval condition setting is executed to set conditions for retrieval of primary information.

At step S3, retrieval is executed on the basis of the retrieval conditions set at step S2.

At step S4, a secondary information list conforming to the retrieval conditions is displayed on the display unit.

At step S5, a specified piece of secondary information is selected for input from the secondary information list displayed on the display unit. Thereupon, primary information with the inputted secondary information is selected and displayed on the display unit.

Now, in conjunction with the above procedure, a subroutine for setting retrieval conditions at aforesaid step S2 will be explained according to a flow chart given in FIG. 23.

At step S21, the next operation to be executed is specified as either setting of contents for retrieval items or operation ending. For this purpose, a cursor is moved to a desired position, either the "END" or "SEARCH ITEMS" position on the retrieval condition setting screen on display to input "END" or "SEARCH ITEMS".

At step S22, it is determined whether or not the input at step S21 is "END". If YES, the retrieval condition setting operation is terminated and the program returns to the main routine of FIG. 22; otherwise, the program proceeds to step S23.

At step S23, the contents of "SEARCH ITEMS" inputted at step S21 are set at given positions on the display, and then the program returns to step S21.

However, the above described prior art information retrieval apparatus has a difficulty in that since a secondary information list is displayed on the display unit after a secondary information retrieval is carried out on the basis of retrieval conditions set at step S2, there may be cases in which when, after a primary information retrieval is made, it is necessary to retrieve the same primary information again. If retrieval conditions different in part from those previously applied, are inputted by an operator who may have forgotten the previously applied conditions, the previously considered primary information can not be it will result that primary information identical with obtained. Another difficulty is that various retrieval conditions previously applied have to be inputted again when such repetition of retrieval is required, which is very troublesome indeed.

SUMMARY OF THE INVENTION

Accordingly, it is an object of the present invention to provide an information retrieval apparatus in which retrieval conditions already set for retrieval of primary information are stored in a memory as required so that when it is necessary to retrieve the same primary information again, the retrieval conditions stored in the memory are accessible. It being thus becomes possible to promptly and accurately perform the retrieval of the same primary information as previously searched.

In order to accomplish this object, the invention provides an information retrieval apparatus wherein retrieval conditions consisting of pieces of secondary information entered through an input device are checked with secondary information that is annexed to a particular piece of primary information registered in a register area for retrieval of the primary information so that a secondary information list is displayed on the display unit. Required pieces of secondary information are selected from the secondary information list whereby the primary information, with the secondary information, is displayed on the display unit. The apparatus comprises registration means for causing the retrieval conditions entered through said input device to be stored in a memory together with titles entered through the input, and call means which calls titles of the retrieval conditions stored in the memory to cause a list of the titles to be displayed on said display unit, whereby required titles can be selected from the title list for retrieval condition setting.

The information retrieval apparatus of the above arrangement operates in the following manner. When a retrieval operation starts and retrieval conditions consisting of pieces of secondary information are entered in place through the input, the retrieval conditions entered are checked with pieces of secondary information accompanying the primary information registered in the register unit so that a secondary information list conforming to the retrieval conditions is displayed on the display unit. By selecting desired pieces of secondary information from the secondary information list it is possible to retrieve the primary information to which the secondary information is assigned.

In the above retrieval operation, where storing of the retrieval conditions is executed in accordance with an operator instruction, the retrieval conditions are stored, with titles inputted through the input, in the memory by the registration means. For the purpose of retrieval condition setting on the basis of the retrieval conditions stored in the memory, the titles of the retrieval conditions stored are called by the call means for display on the display unit.

Therefore, when a particular piece of primary information previously searched is to be searched again, relevant titles are selected from the title list on display, whereby the same retrieval conditions as set previously can be set without being newly inputted through the input for resetting, it being thus possible to perform prompt and accurate retrieval of the same primary information as previously searched.

It is another object of the invention to provide an information retrieval apparatus which can restrict items to be listed with respect to retrieval conditions displayed on a display unit upon entry of the retrieval conditions in a retrieval condition setting operation. Thus, no turning over of a new page on a screen is required which enables necessary items of the retrieval conditions to be readily inputted through the least possible cursor movement.

In order to accomplish this object, the invention provides an information retrieval apparatus wherein retrieval conditions inputted through an input device, according to a list of items for retrieval conditions consisting of pieces of secondary information displayed on a display unit, are checked with secondary information that is annexed to a particular piece of primary information registered in a register unit for retrieval of the primary information so that a secondary information list is displayed on the display unit. Required pieces of secondary information are selected from the secondary information list, whereby the primary information with the secondary information is displayed on the display unit. The apparatus comprising: retrieval condition restricting means for restriction of items to be listed for retrieval conditions displayed on the display unit, whereby a list of items for retrieval conditions restricted by said retrieval condition restricting means is displayed on the display unit so that retrieval conditions can be inputted through the input device on the basis of the restricted retrieval condition list on display.

According to the above arrangement, when a retrieval operation starts and restriction of items to be listed is executed according to an operator instruction, items of retrieval conditions consisting of pieces of secondary information to be listed are restricted by the retrieval condition restricting means. Thus, a restricted list of retrieval conditions is displayed as such and retrieval conditions are inputted accordingly through the input. The inputted retrieval conditions are checked with pieces of secondary information accompanying relevant primary information registered in the register unit so that a secondary information list conforming to the retrieval conditions is displayed on the display. As such, only if the operator selects desired pieces of secondary information from the secondary information list, the primary information to which the selected secondary information is annexed can be searched for display.

Where no step is taken for restriction of items to be listed, a predetermined list of all items is displayed on the display unit, and retrieval conditions are inputted according to the non-restricted list of items.

According to the above described arrangement, therefore, items to be listed as retrieval conditions for display upon entry of retrieval conditions can be restricted to necessary items only, it being thus possible to input information for necessary retrieval conditions without change or leafing of pages on a screen, which results in much cursor movement.

It is another object of the invention to provide an information retrieval apparatus which can restrict items to be listed with respect to secondary information displayed on the display unit in a retrieval operation, thereby enabling many pieces of secondary information to be readily compared with one another in one operation for selection of desired pieces of secondary information with turning over of less pages and/or less scrolling.

In order to accomplish this object, the invention provides an information retrieval apparatus wherein retrieval conditions consisting of pieces of secondary information inputted through an input device are checked with secondary information that is annexed to a particular piece of primary information registered in a register unit for retrieval of the primary information so that a secondary information list consisting of given items is displayed on the display unit. Required pieces of secondary information are selected from the secondary information list on display whereby the primary information with the secondary information is displayed on the display unit. The apparatus comprises secondary information list restricting means for restriction of constituent items of the second information list displayed on the display unit, whereby desired pieces of secondary information can be selected from the restricted secondary information list on display.

According to the above arrangement, when a retrieval operation starts and retrieval conditions consisting of pieces of secondary information are inputted through the input, the inputted retrieval conditions are checked with pieces of secondary information annexed to the primary information registered in the register unit, whereupon a of secondary information list matching the retrieval conditions is displayed on the display unit. In this case, if, according to an operator instruction, a step is taken for restriction of items to be listed, items in the secondary information list displayed on the display unit are restricted by the secondary information list restricting means. Then, a restricted secondary information list is displayed on the display unit so that by selecting desired pieces of secondary information from the restricted secondary information list, desired primary information to which the selected secondary information is annexed can be searched out.

If no step is taken for restriction of items to be listed, a secondary information list consisting of regular prescribed items is displayed on the display unit and required pieces of secondary information are selected from the non-restricted secondary information list.

Therefore, in the selection of the secondary information, items of a secondary information list to be displayed on the display can be restricted to necessary items only, which makes it possible to readily select desired pieces of secondary information with less trouble in regard to leafing of pages and screen scrolling.

It is still another object of the invention to provide an information registering apparatus which enables one to select an optimum key word by inputting a symbol (which word "symbol" is herein intended to include characters) properly representing a piece of secondary information to be annexed to a primary information and retrieving and listing key words partially agreeing with the symbol.

In order to accomplish this object, the invention provides an information registering apparatus wherein keywords defining pieces of secondary information for addition to pieces of primary information entered in a register are stored in a memory, the stored keywords being displayed on a display as required so that desired keywords can be selected from among the displayed keywords for addition to a particular piece of information to be entered in the register. The apparatus comprises an input for inputting a symbol representing a piece of secondary information to be added to the information to be registered, and a retrieval section which performs retrieval and selection of keywords stored in the memory that partially agree with the symbol representing the inputted secondary information, whereby the keywords selected by the retrieval section are displayed on the display.

According to the above construction, upon start of a secondary information setting operation, a symbol representing a piece of secondary information to be added to a particular piece of information to be entered in the register is inputted through the input. Then, a retrieval is carried out by the retrieval section of defined key words stored in the memory that are in partial agreement with the symbol inputted through the input, and such key words in partial agreement with the symbol are selected for display on the display unit. When a required key word is selected by the operator out of the key words so displayed, the selected key word is annexed in position to the information to be registered and is entered in the register accordingly.

Therefore, according to the invention, it is possible to list only those key words which more appropriately represent the secondary information to be annexed, thereby enabling an optimum key word to be selected in a short time.

It is another object of the invention to provide an information registration retrieval apparatus which is easy to operate and capable of efficiently performing registration of a document by inputting secondary information as required prior to, or in the course of, scanning and inputting of primary information, and registering the inputted secondary information as an addition to the inputted primary information.

In order to accomplish this object, the invention provides an information registration retrieval apparatus wherein primary information produced by converting a document into an image signal is registered in a register area together with secondary information used to retrieve the primary information and the desired primary information is retrieved on the basis of the secondary information. The apparatus comprises memory means for storing primary information with secondary information added thereto, switch means which actuate input means for inputting secondary information, and registration means for causing the memory means to store therein secondary information as an addition to inputted primary information. The secondary information is inputted through the input means in response to a signal sent from the switch means as required prior to, or in the course of, the primary information being inputted.

According to the above arrangement, a document is converted into image signals by a scanner or the like for entry as primary information. If the switch means is depressed prior to the primary information being inputted, the input means is actuated to input secondary information and the registration means causes the secondary information to be stored in the memory means in the form of an annex to the primary information at a later time when the primary information is inputted. If the switch means is depressed in the course of the input of the primary information and scanning or inputting of the secondary information is inputted through the input means, the registration means causes the memory means to store therein the primary information, only after the step of scanning and inputting thereof is completed, with the secondary information added thereto. In this case, secondary information inputted in the course of the scanning and inputting step is added to the primary information irrespective of any secondary information inputted prior to that step. In this way, by using the switch means and input means the operator can input secondary information at any time prior to, or in the course of, the scanning and inputting step so that the secondary information is registered in the form of information attached to the inputted primary information.

It is another object of the invention to provide an information registration retrieval apparatus which can efficiently register many pieces of primary information having the same secondary information by storing a plurality of the latest pieces of secondary information in memory.

In order to accomplish this object, the invention provides an information registration retrieval apparatus which includes a memory for storing therein a plurality of the latest various pieces of secondary information inputted sequentially through an input device for addition to pieces of primary information, and a secondary information calling key for instructing read-out of a plurality of pieces secondary information. The plurality of pieces of secondary information are read out from the memory and displayed on a display unit in accordance with instruction from the secondary information calling key so that a particular piece of secondary information specified through the input device was selected from among the plurality of pieces of secondary information and registered as an attachment to a particular piece of primary information.

According to the above arrangement, a plurality of latest various pieces of secondary information sequentially inputted through the input for addition to pieces of primary information are stored in the memory. When the secondary information calling key is depressed, a plurality of pieces of secondary information are read out from the memory and displayed on the display unit. An operator selects, through a cursor key or the like, a desired piece of secondary information out of the pieces of secondary information displayed on the display unit. Thereupon, the selected secondary information is stored and registered in place as an attachment to a particular primary information inputted. Therefore, when a number of pieces of primary information requiring the same piece of secondary information to be attached thereto are to be registered, the piece of secondary information can be quickly selected from the memory in which the latest pieces of secondary information only are stored, without trouble being taken to select the same piece of secondary information each time from a list showing all existing pieces of secondary information. Thus, efficient registration of primary information with the same secondary information annexed thereto is realized.

It is a further object of the invention to provide an information registration retrieval apparatus which, by storing in memory a piece of secondary information added to a piece of primary information registered immediately prior to a piece of primary information actually to be stored, and reading out the secondary information, enables easy and prompt setting of a similar piece of secondary information to be added to a number of pieces of primary information of similar contents and prompt registration of primary information with respective secondary information annexed thereto.

In order to accomplish this object, the invention provides an information registration retrieval apparatus wherein primary information produced by converting a document into an image signal is registered in a register area together with secondary information used to retrieve the primary information and the desired primary information is retrieved on the basis of the secondary information. The apparatus comprises a memory for storing therein secondary information inputted manually for addition to primary information, secondary information write means for writing the secondary information into the memory in response to a write command or registration command from the operator at the step of manual inputting or primary information registering, secondary information call means for instructing read-out of the secondary information from the memory, and secondary information read-out means for reading out the secondary information stored in the memory in accordance with the instruction from the secondary information call means to cause the secondary information to be displayed on a display unit and to set it as secondary information to be attached to the primary information.

Secondary information, as it is manually inputted for being added to primary information read out by means of a scanner or the like, is written into the memory by the secondary information write means at either an operator's write command given at the manual input time or an operator's registration command given at the step of registering primary information and is stored as such in the memory. The secondary information is attached to the primary information and is stored and registered in the memory together with the primary information. Subsequently, when the operator instructs read-out of the secondary information through the secondary information call means, the secondary information call means responds to the instruction and reads out the secondary information stored in the memory to cause the secondary information to be displayed on the display unit and set as secondary information to be attached to a piece of primary information which is to be subsequently read by the scanner or the like. The so set secondary information is applied to the subsequently read-out primary information as an attachment thereto and the primary information is stored and registered in the memory together with the attachment of secondary information. Therefore, when many pieces of primary information requiring the same piece of secondary information are to be registered, the operator can execute secondary information setting by using the same secondary information as used in a previous primary information registration, by mere instruction through the secondary information call means and without the trouble of repeating manual input of the same secondary information each time.

It is a still further object of the invention to provide an information registration retrieval apparatus which makes it possible to easily specify a series of pages of primary information desired to be printed on a display screen and efficiently print out of the series of pages of the primary information.

In order to accomplish this object, the invention provides an information registration retrieval apparatus wherein primary information produced by converting a document into an image signal is registered in a register area together with secondary information used to retrieve the primary information. The desired primary information is retrieved on the basis of the secondary information and retrieved primary information is displayed on a screen of the display and printed out onto recording paper. The apparatus comprises page designation means for enabling the operator to designate, during page after page scrolling, first and last pages of a document consisting of a series of pages of primary information to be printed out that has been retrieved and displayed on the display on the basis of secondary information attached thereto, a memory for storing therein primary information, displayed information holding means for causing an initially designated page of primary information to be stored in the memory and for holding the primary information as displayed on a part of the display, page changing means for causing primary information on pages following the initially designated page to be stored in the memory and for causing primary information on the following pages to be sequentially displayed on the display, and print-out control means for outputting to a printer primary information stored in the memory when the designation of the first and last pages is effected by the page designation means.

According to the above arrangement, when primary information retrieved on the basis of secondary information is displayed on the display, an operator causes the primary information, which is foliated, to be displayed page by page on the screen of the display by means of a next-page key, or the like. For example, a first page of a series of primary information to be printed out appears on the screen, the operator designates that particular page by using the page designation means. Thereupon, the displayed information holding means causes the primary information on the designated first page to be stored in the memory, keeping the primary information displayed on a part of the display. The page changing means causes the primary information on a page subsequent to the first page to be stored in the memory and displayed on the display screen. Finally, when the last page of primary information to be printed out appears on the display screen, the operator designates that particular page by using the page designation means and thereupon the print-out control means outputs to the printer the primary information on the designated last page and the primary information stored in the memory. Thus, watching the display screen, the operator can easily designate a series of pages of primary information for print out and cause the designated primary information to be efficiently printed out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

First Embodiment

Figure 1:
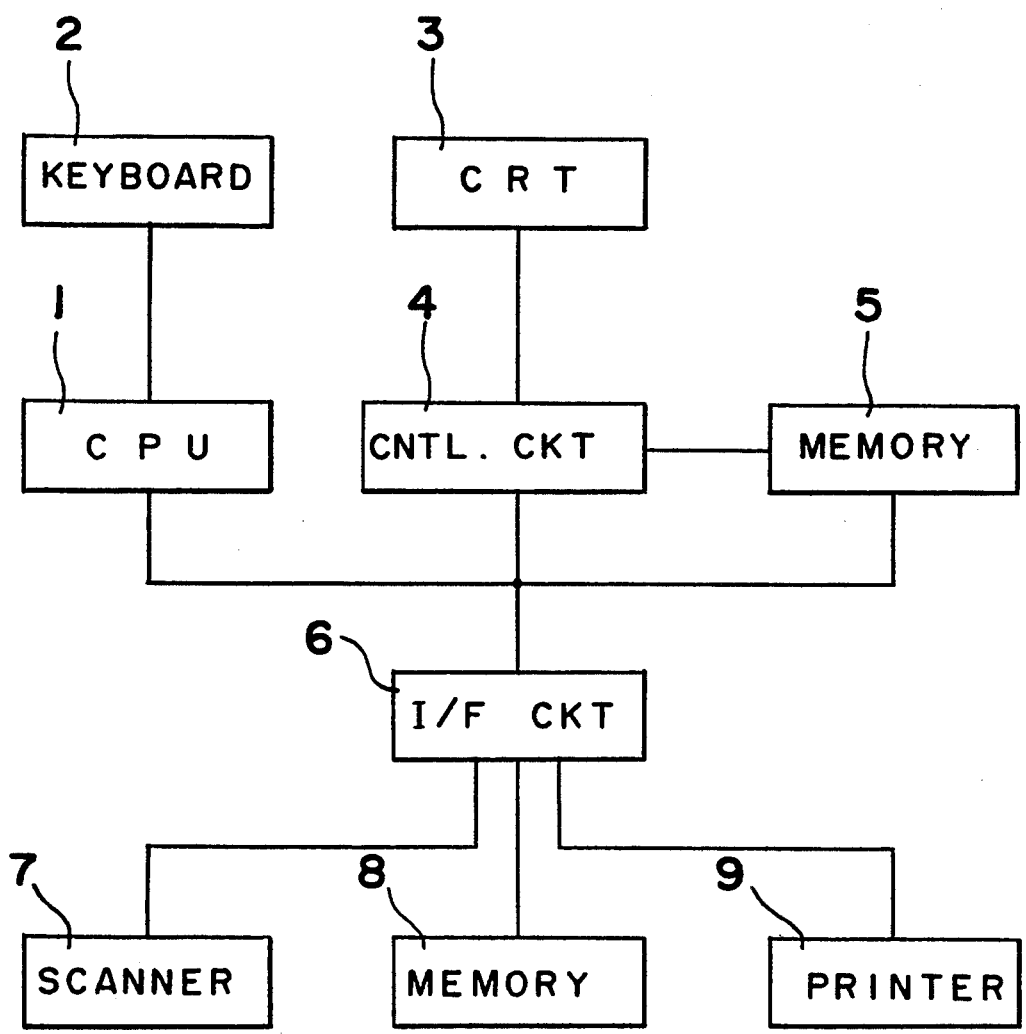
FIG. 1 is a block diagram showing an information retrieval apparatus of a first embodiment of the invention.

FIG. 1 is a block diagram showing one form of an information retrieval apparatus embodying the invention. The apparatus includes a CPU 1 for controlling the entire apparatus to perform retrieval operation, etc.; a keyboard 2 for manually inputting retrieval conditions to be set during a retrieving operation with respect to registered primary information, and also titles to be attached to the retrieval conditions; a CRT (cathode ray tube) 3 for display of a secondary information list to be selected in such a manner described later in detail, a list of titles for the retrieval conditions, and a scope for retrieval condition setting; a control circuit 4 for controlling the CRT 3 and a memory 5 which temporarily stores therein information and retrieval conditions for retrieval operation that are to be displayed on the CRT 3, and other units; a memory device 8 having areas such as a register area for registration of primary information and a memory area for storage of set retrieval conditions; a scanner 7 utilized as a read device to be employed for primary information inputting which reads out a document to convert the same into image information; and a printer 9 for printing out retrieved primary information onto paper. The scanner 7, the memory device 8, and the printer 9 are connected through an interface circuit 6 to the CPU 1, the control circuit 4, and the memory 5.

In the retrieval operation of the information retrieval apparatus, when retrieval conditions consisting of pieces of secondary information are inputted from the keyboard 2, the memory means of the CPU 1 causes the inputted retrieval conditions to be stored in the memory area of the memory device 8 at the request of an operator. In executing the retrieval of a primary information using the stored retrieval conditions, a call means of the CPU 1, calls for the stored retrieval conditions by the request of the operator and sets them as such for the retrieval operation. Subsequently, the CPU 1 controls relevant units to check the inputted retrieval conditions with pieces of secondary information attached to primary information registered in the register area of the memory device 8. As a result, a list of the secondary information satisfying the retrieval conditions is displayed on the CRT 3. This retrieval operation will be further explained hereinafter with reference to flow charts given in FIGS. 2 and 3.

Figure 2:
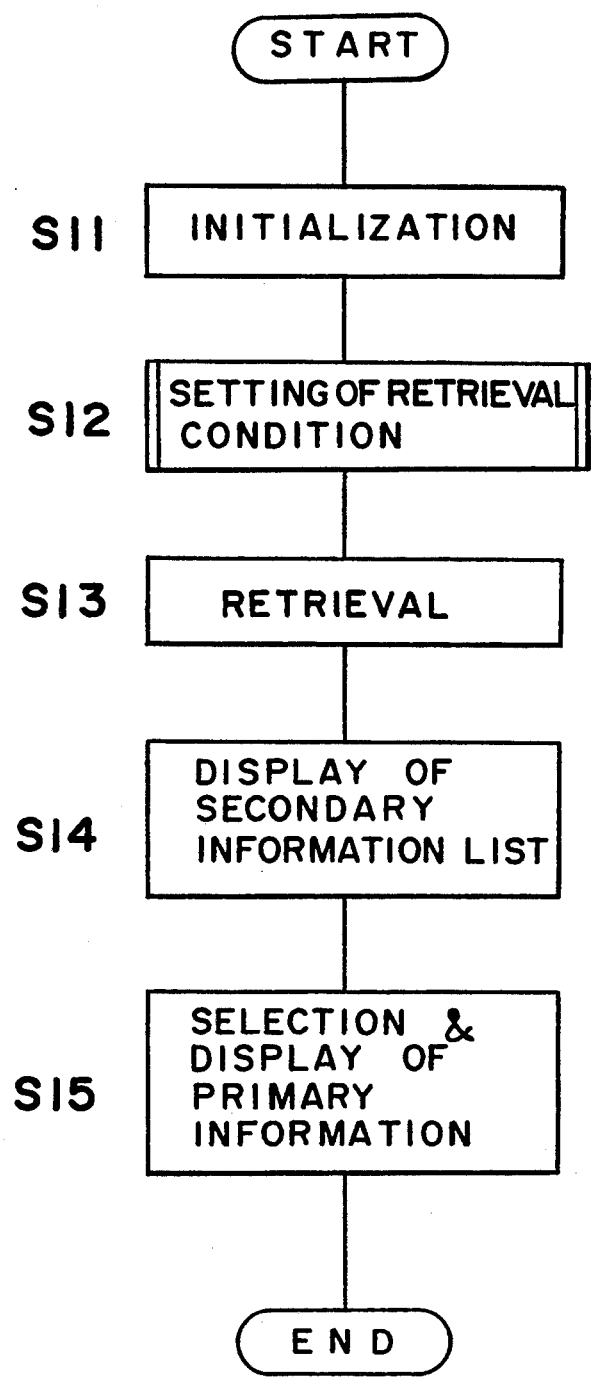
FIGS. 2 and 3 are flow charts showing the process of retrieval operation of the first embodiment.

FIG. 2 shows a main routine for the retrieval operation. At step S11, initialization for displaying lists, etc. is carried out. A retrieval condition setting operation is executed at step S12 to set retrieval conditions. Then, at step S13, a retrieval is carried out on the basis of the set retrieval conditions. A secondary information list satisfying the retrieval conditions is displayed on the CRT 3 at step S14, and a desired piece of secondary information is selected and inputted by the operator at step S15. Thereupon, primary information to which the selected secondary information is attached is selected.

Figure 3:
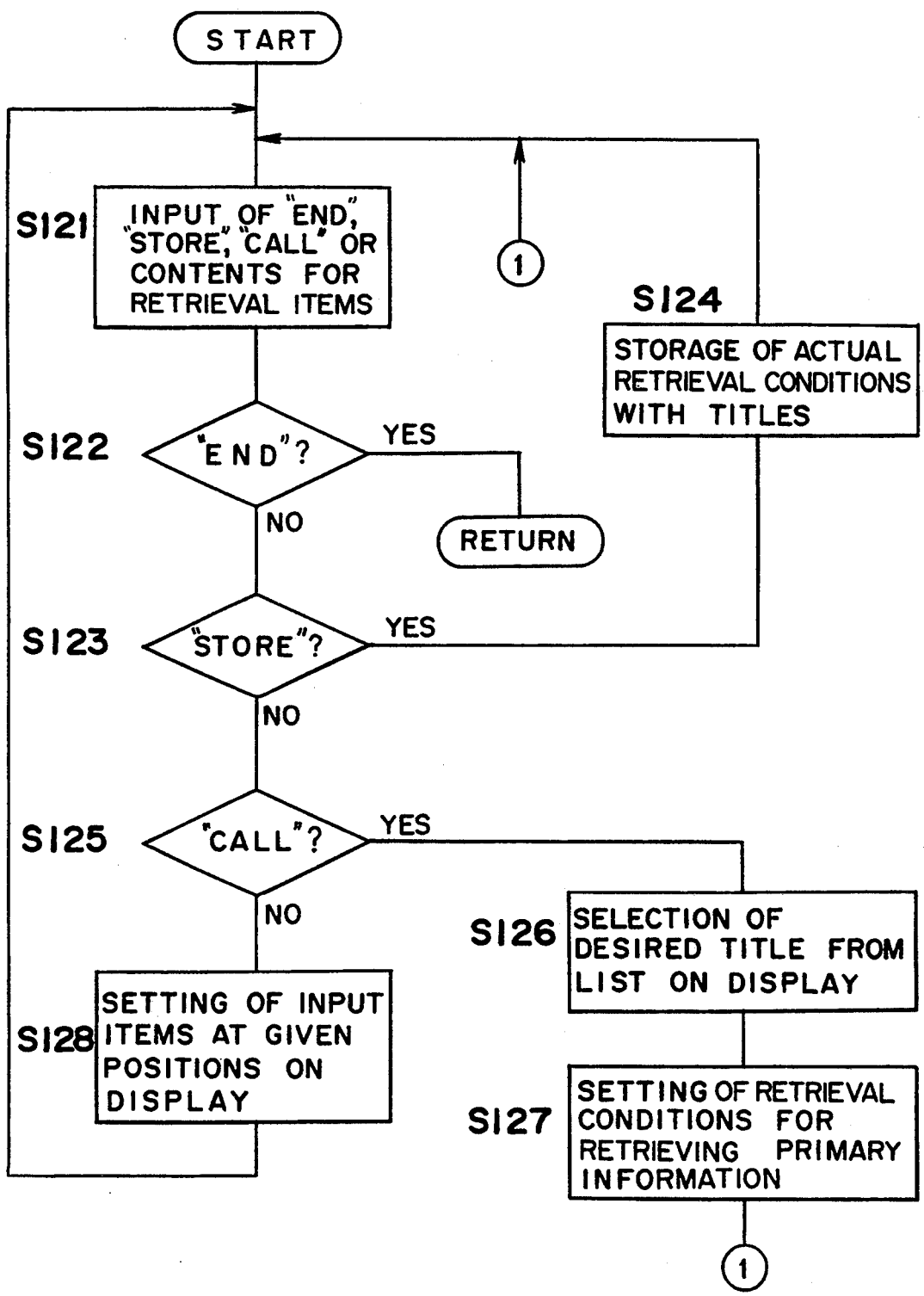

The following describes a subroutine for the retrieval condition setting at step S12 referring to the flow chart shown in FIG. 3.

At step S121, one of the following is selected as a next operation to be executed: item setting for retrieval conditions, operation ending, storing of retrieval conditions, and retrieval condition calling. That is, the cursor is moved to one desired position selected from the following four positions representing, "RETRIEVAL ITEMS" containing particular items of the retrieval conditions, "END", "STORE", and "CALL", as displayed on the CRT 3, and the selection made is inputted.

At step S122, a decision is made as to whether the inputted selection is "END" or not. If the decision is "END", the retrieval condition setting operation is terminated, and program returns to the main routine. Otherwise, the program proceeds to step S123.

At step S123, it is determined whether the selection inputted at step S121 is "STORE" or not. If the decision is "STORE", the program proceeds to step S124, and if not, the program proceeds to step S125.

At step S124, a title to be inputted from the keyboard 2 is applied to actual retrieval conditions presently set (i.e., a series of items set at given positions for the retrieval condition setting as displayed on the CRT 3), which retrieval conditions are then stored together with the title in the memory area, whereupon the program returns to step S121.

At step S125, it is determined whether the selection inputted at step S121 is "CALL" or not. If the decision is "CALL", the program proceeds to step S126; if not, program proceeds to step S128.

At step S126, a list of titles applied to the respective retrieval conditions stored in the memory area is displayed on the CRT 3 and the operator selects a desired title from the title list and inputs the same.

At step S127, a retrieval condition corresponding to the title selected at step S126 is set as a retrieval condition for the primary information retrieval; then the program returns to step S121.

At step S128, the items of the retrieval conditions inputted at step S121 are set at given positions on display; then the program returns to step S121.

To sum up, when setting retrieval conditions and storing them in memory, items or entries for the retrieval conditions are inputted at step S121, and contents for the inputted retrieval items are set at step S128 via steps S122, S123, and S125. Then, returning to step 121, an operator inputs "STORE"; and the retrieval conditions are stored in the memory area at step S124 via steps S122, S123. When executing a retrieval using the retrieval conditions stored in the memory area, "CALL" is inputted at step S121, and after passing through steps S122, S123, S125, S126, at step S127 one item is selected from among the stored retrieval conditions and set as a condition for the retrieval. Then, at step 121, "END" is inputted, and at step S122 the program returns to the main routine for execution of the retrieval. When executing the retrieval by setting the retrieval conditions in the same manner as the conventional practice, items for retrieval conditions are inputted and set in position at steps S121, S122, S123, S125, and S128. Then, at step S121, "END" is inputted, and at step S122 the program returns to main routine for the execution of the retrieval.

In this way the retrieval conditions preset for a retrieval of primary information are stored in the memory area and, when it is necessary to retrieve the primary information again, the retrieval conditions stored already in the memory area are read out for the retrieval operation. Therefore, the problem inherent to the prior art apparatus that retrieval conditions partially different from those used for a previous primary information retrieval may not retrieve the same primary information is eliminated, end as a result, the same primary information as previously obtained can be accurately searched out in short time.

As is apparent from the above description, according to the present invention, an information retrieval apparatus, wherein retrieval conditions entered through an input device are checked with pieces of secondary information attached to respective pieces of primary information registered in a register area so that a secondary information list matching the retrieval conditions is displayed, is provided with memory means for storing therein the inputted retrieval conditions with titles, and calls means which call titles of the retrieval conditions stored in the memory means, whereby a list of the titles called by the call means is displayed so that desired retrieval conditions can be set by selecting a corresponding title from the list. Therefore, when primary information once searched out is to be retrieved again, the same retrieval conditions as previously used can be set in a short time, it being thus possible to easily and accurately retrieve the same primary information as previously obtained.

Second Embodiment

Figure 4:
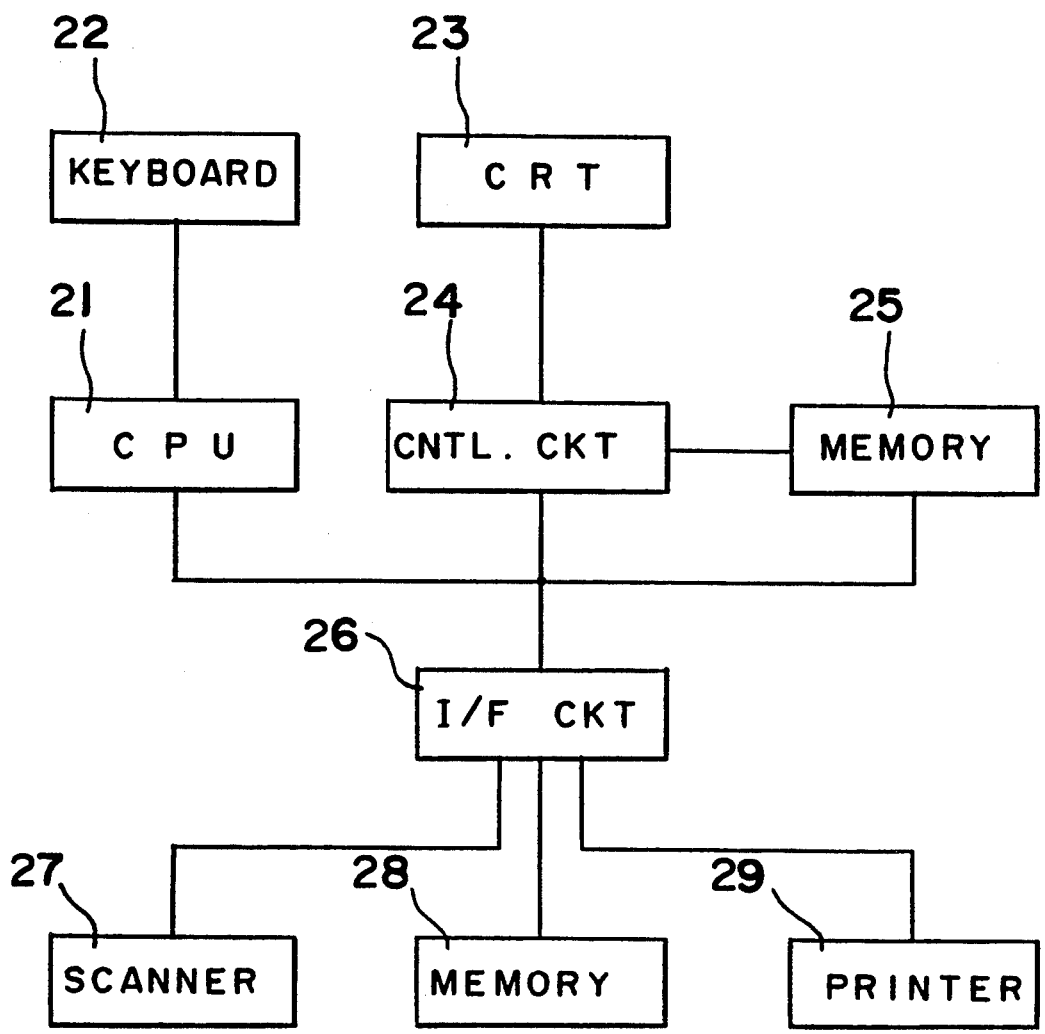
FIG. 4 is a block diagram showing an information retrieval apparatus of a second embodiment of the invention.

FIG. 4 is a block diagram showing another form of an information retrieval apparatus embodying the invention. The apparatus includes a CPU 21 for controlling the entire apparatus to perform a retrieval operation, etc.; a keyboard 22 for manually inputting retrieval conditions, etc. to be set for the retrieving operation with respect to registered primary information; a CRT 23 for displaying a secondary information list, an item list for the retrieval conditions, or other images, which lists are made in a manner described later in detail; a control circuit 24 for controlling units such as the CRT 23 and a memory 25 which temporarily stores therein retrieval conditions for the retrieval operation and information that is to be displayed on the CRT 23; a memory device 28 with areas including a register area for registration of primary information; a scanner 27 for use in connection with primary information reading and inputting, etc.; and a printer 29 to be used for outputting primary information selected through a retrieval operation. The scanner 27, the memory device 28, and the printer 29 are connected through an interface circuit 26 to the CPU 21, the control circuit 24, and the memory 25.

Figure 5:
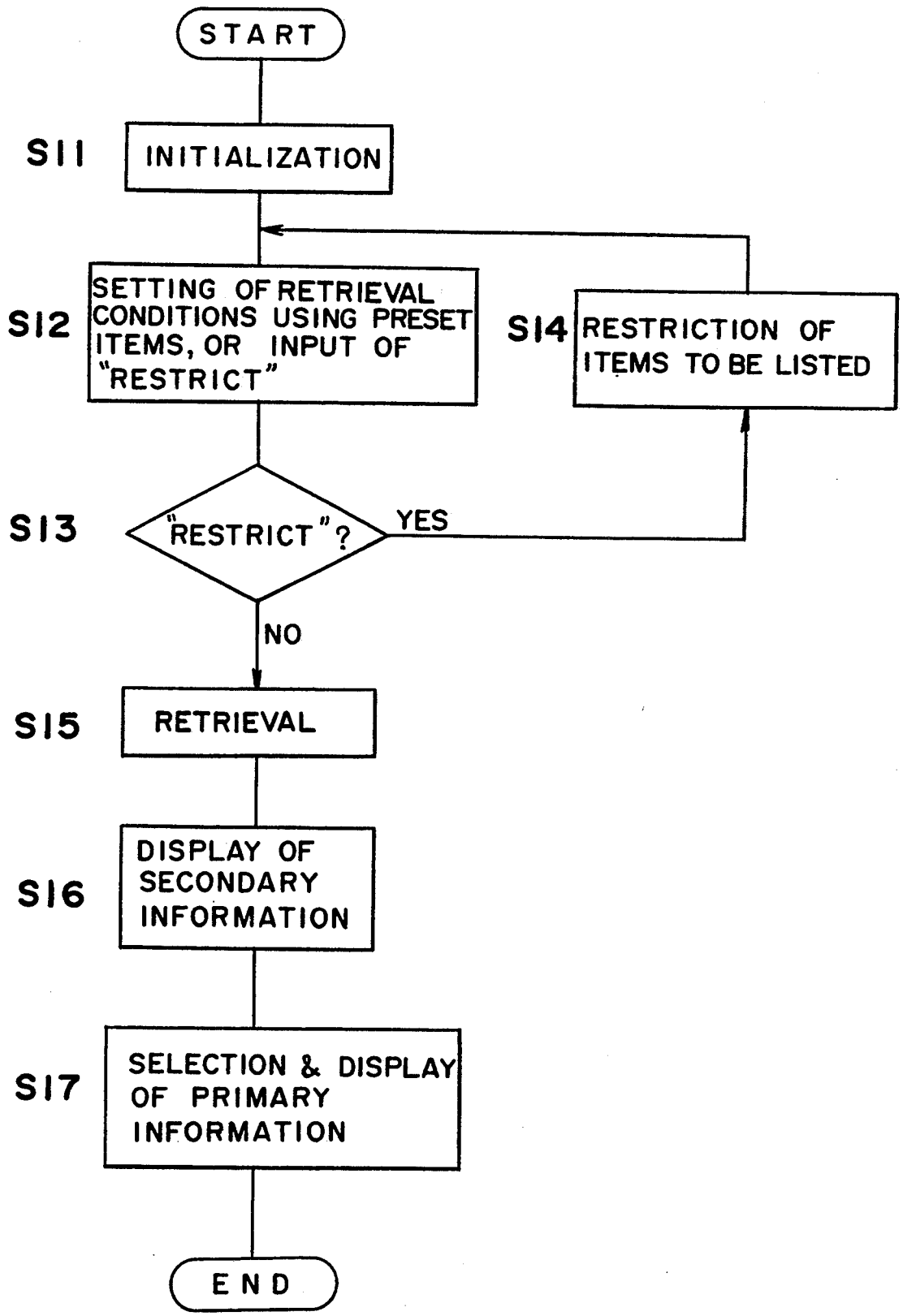
FIG. 5 is a flow chart of retrieval operation of the second embodiment.

In the retrieval operation by the information retrieval apparatus, items to be listed for retrieval condition setting are restricted by retrieval condition restricting means of the CPU 21 at the request of an operator, and accordingly a list of restricted items for retrieval conditions consisting of secondary information is displayed on the CRT 23. Required retrieval conditions are inputted from the keyboard 22 on the basis of the restricted item list. Thereupon, the CPU 21 controls relevant units to cause the inputted retrieval conditions to be checked with pieces of secondary information attached to the respective pieces of primary information registered in the register area of the memory device 28, and a secondary information list conforming to the retrieval conditions is displayed on the CRT 23. This retrieval process will now be explained with reference to a flow chart shown in FIG. 5.

At step S11, initialization is executed for displaying various lists, etc.

At step S12, a retrieval condition setting operation is executed for presetting retrieval conditions required for a retrieval of desired primary information. To carry out the retrieval condition setting operation, the cursor is moved to a position designating a desired item in the item list displayed on the CRT 23 and the content of the desired item is inputted from the keyboard 22. For ordinary display purposes, the item list consists of predetermined items, and for the purpose of display after such restriction on items to be listed as will hereinafter be described is executed, the item list consists of particular limited items. Further, the list of items includes, for example, an item "RESTRICT" for executing a restriction on items to be listed. To execute such a restriction, the cursor is moved to "RESTRICT" and input is made accordingly.

At step S13, it is determined whether the input is "RESTRICT" or not. If "RESTRICT" is inputted, the program proceeds to step S14, and if not, the program proceeds to step S15.

At step S14, the restriction on items to be listed is carried out in the following manner and then program returns to step S12. That is, at step S14, necessary items only are selected from predetermined items for the retrieval condition setting in accordance with an operator's instruction inputted from the keyboard 22. In a later stage of the operation, the list consisting of the selected items only is displayed on the CRT 23.

At step S15, a retrieval process is carried out on the basis of the retrieval conditions set at step S12.

Figure 22:
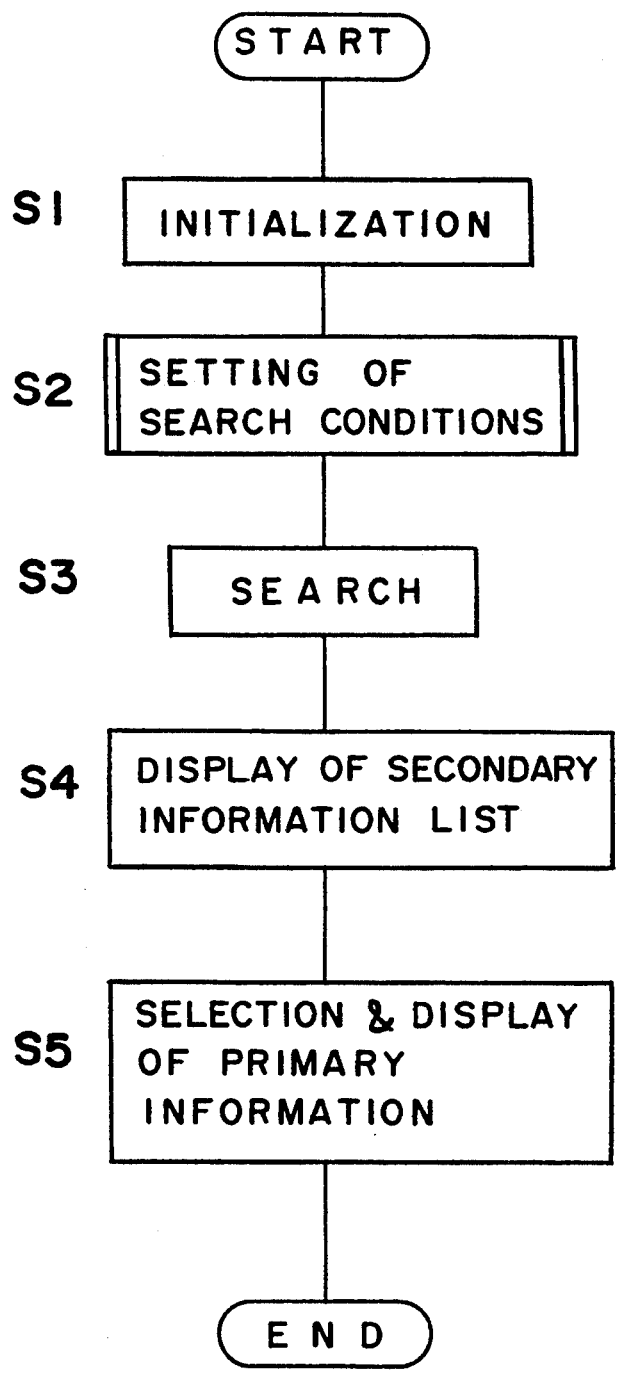
FIGS. 22 and 23 are flow charts showing prior art retrieval operation process.
Figure 23:
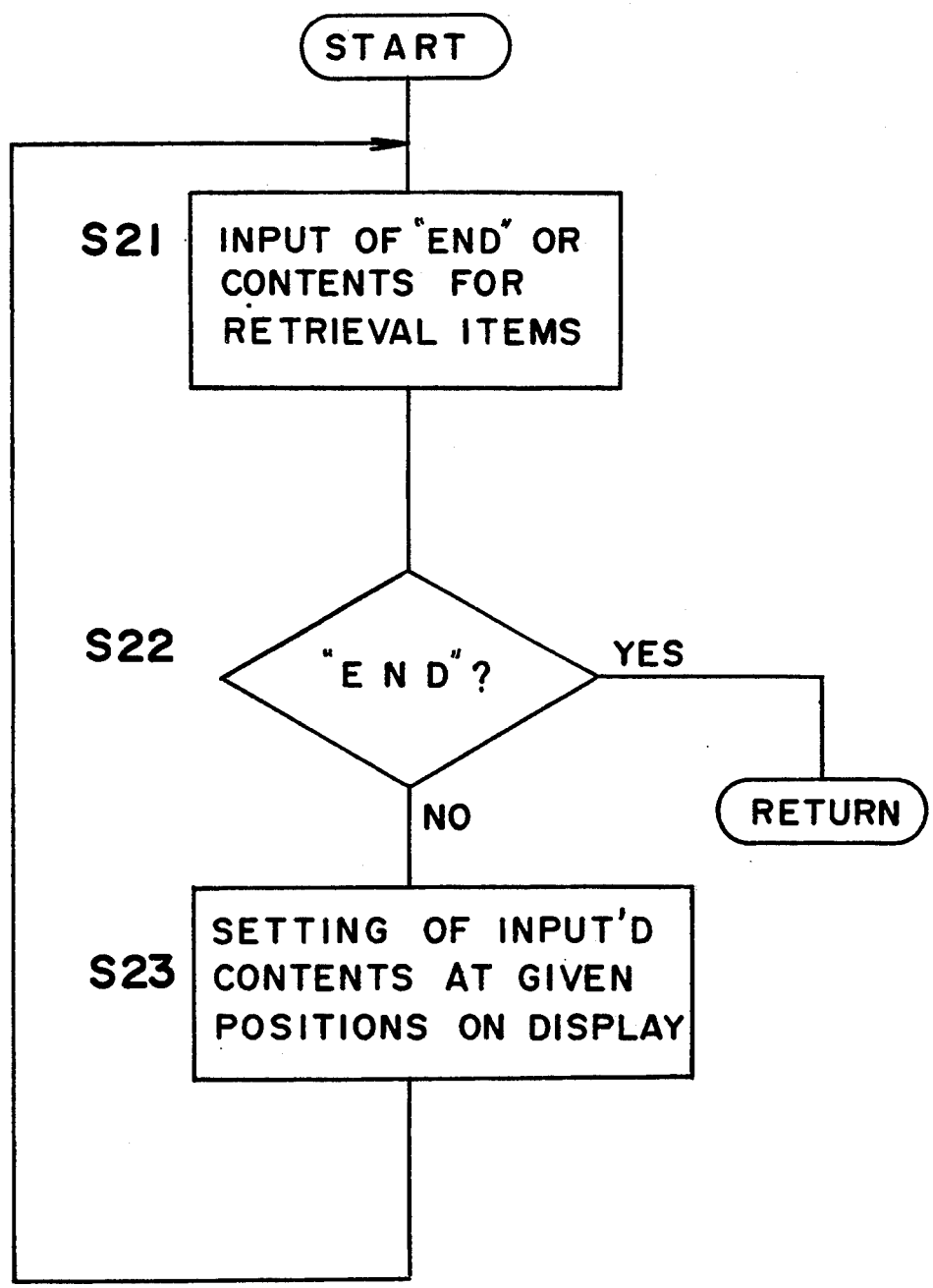

Subsequently, at step S16, a list of the secondary information items matching the retrieval condition is displayed on the CRT 23 and thereafter, at step S17, a desired secondary information item is selected and inputted by the operator, whereupon corresponding primary information to which the secondary information is attached is retrieved. These steps correspond to steps S4 and S5 in the flow chart of FIG. 22 for the operation with the prior art arrangement.

As obvious from the above, according to the information retrieval apparatus of this embodiment, when a list of predetermined items for retrieval conditions extends over a plurality of pages, items to be listed are limited to only necessary items by the operator's instructions, and the retrieval conditions are inputted according to the restricted item list. Therefore, when inputting retrieval conditions, changing pages on the screen is not required and therefore retrieval conditions can easily be inputted with less trouble of cursor movement.

The display of restricted items on the display device can be effected as a "default" or failure-free function.

As is apparent from the above description, according to the present invention, an information retrieval apparatus, wherein retrieval conditions entered through an input device according to a list of items for retrieval conditions are checked with secondary information attached to corresponding primary information registered in a register unit so that a secondary information list matching the retrieval conditions is displayed, is further provided with retrieval condition restricting means for restricting items to be listed on a display unit and used for inputting retrieval conditions, whereby retrieval conditions can be inputted according to a list of restricted items. Therefore, according to the invention, no change of pages on the screen is necessary in connection with the inputting of retrieval conditions, it being thus possible to readily input necessary items for retrieval condition setting, with less trouble of cursor movement.

Third Embodiment

Figure 6:
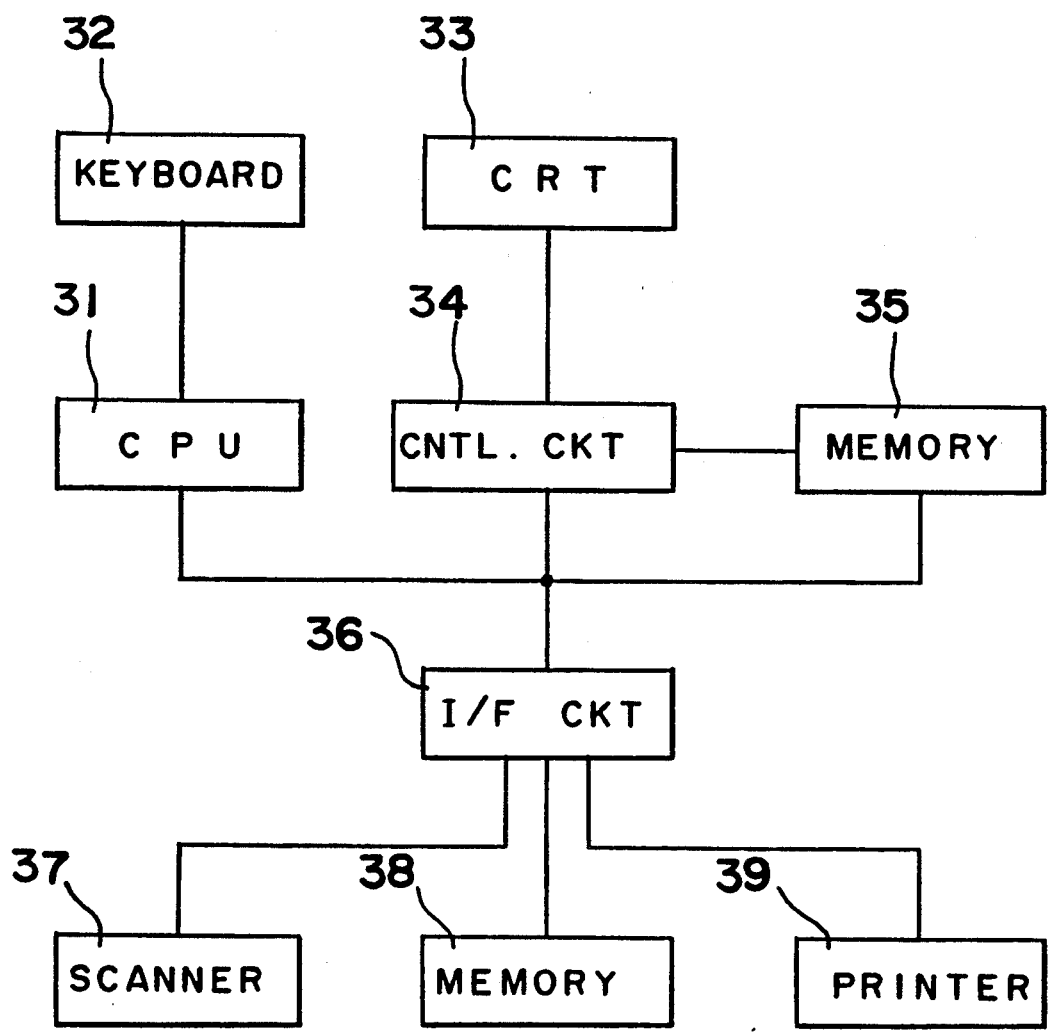
FIG. 6 is a block diagram showing an information retrieval apparatus of a third embodiment of the invention.

FIG. 6 is a block diagram showing another form of an information retrieval apparatus embodying the invention. The apparatus includes a CPU 31 for controlling the entire apparatus to perform a retrieval operation, etc.; a keyboard 32 for manually inputting data such as retrieval conditions to be set for the retrieval operation with respect to registered primary information; a CRT 33 for displaying data such as a secondary information list or an item list for the retrieval conditions, which lists are made in a manner described later in detail; a control circuit 34 for controlling units such as the CRT 33 and a memory 35 which temporarily stores therein the retrieval conditions and information that is to be displayed on the CRT 33; a memory device 38 with areas including a register area for registering primary information; a scanner 37 used mainly for reading and inputting primary information; and a printer 39 used for outputting primary information selected through the retrieval operation. The scanner 37, the memory device 38, and the printer 39 are connected through an interface circuit 36 to the CPU 31, the control circuit 34, and the memory 35.

Figure 7:
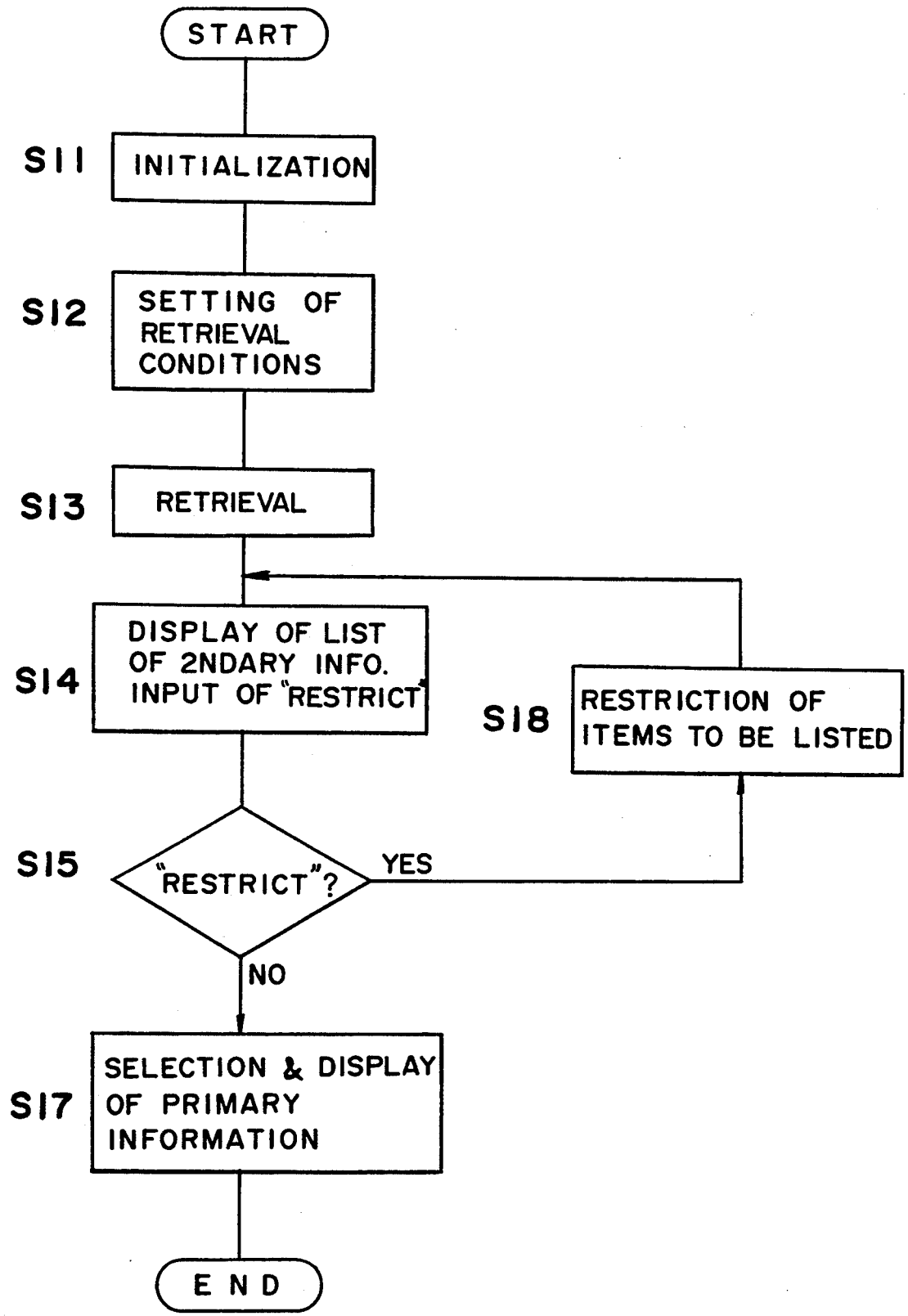
FIG. 7 is a flow chart of retrieval operation of the third embodiment.

In the retrieval operation by the information retrieval apparatus, when retrieval conditions consisting of secondary information are inputted from the keyboard 32, the CPU 31 controls individual units to cause the inputted retrieval conditions to be checked with secondary information attached to corresponding primary information registered in the register area of the memory device 38, and a list of the secondary information conforming to the retrieval conditions is displayed on the CRT 33. In this conjunction, if desired, items of the secondary information list can be restricted on the display. This retrieval operation will now be explained with reference to a flow chart shown in FIG. 7.

At step S11, initialization is executed for displaying various lists as mentioned above.

At step S12, the retrieval condition setting operation is executed for setting retrieval conditions for a retrieval of primary information. To carry out this step of retrieval condition setting, the cursor is moved to positions corresponding to required items in a list of retrieval condition items displayed on, for example, the CRT 23, and the selection is inputted through the keyboard.

At step S13, a retrieval is carried out on the basis of the retrieval conditions set at step S12.

At step S14, a list of secondary information matching the retrieval conditions is displayed on the CRT 33. For ordinary display purposes, the secondary information list consists of predetermined items, and for the purpose of display after the restriction on items to be listed is executed as described later, the list consists of particular limited items. Further, the secondary information list may include, for example, an item "RESTRICT" for executing the restriction on items to be listed. The designation of the item "RESTRICT" is carried out by the cursor movement.

At step S15, it is determined whether the input made at step S14 is "RESTRICT" or not. If "RESTRICT" is inputted, the program proceeds to step S16, and if not, the program proceeds to step S17.

At step S16, the restriction operation on secondary information items to be listed is carried out in the following manner and then program returns to step S14. That is, at step S16, necessary items only are selected from predetermined items for the retrieval condition setting in accordance with instructions inputted from the keyboard 32. Thereafter, when display of the secondary information list is required again at step S14, the secondary information list consisting of the selected items only is displayed on the CRT 33.

At step S17, desired secondary information is selected from the secondary information list displayed on the CRT 33 and is inputted accordingly. Thereafter, a piece of primary information to which secondary information identical with the inputted secondary information is attached is selected from the primary information registered in the register area, and is displayed on the CRT 33 accordingly.

As described above, according to the present embodiment of the invention, if many unnecessary items are included in a secondary information list displayed, items in the list can be limited to necessary items only in response to an instruction from the operator so that the desired secondary information is selected from a list including such restricted secondary information. Therefore, in selecting the required secondary information, it is possible to readily compare many sets of secondary information at a time with less page changing operation and less image scrolling.

The display of restricted items on the screen can be effected as a "default" or failure-free function.

As is apparent from the above description, according to the present invention, an information retrieval apparatus, wherein retrieval conditions entered through an input device are checked with secondary information attached to corresponding primary information registered in a register unit so that a list of the secondary information matching the retrieval conditions is displayed, is provided with restricting means for restricting constituent items of the secondary information list displayed on a display screen, whereby desired secondary information can be selected from the restricted secondary information list on display. Therefore, according to the invention, it is possible to readily compare many sets of secondary information at a time and with less trouble of page changing and image scrolling operations, thereby the selecting operation of desired secondary information is easily done.

Fourth Embodiment

Figure 8:
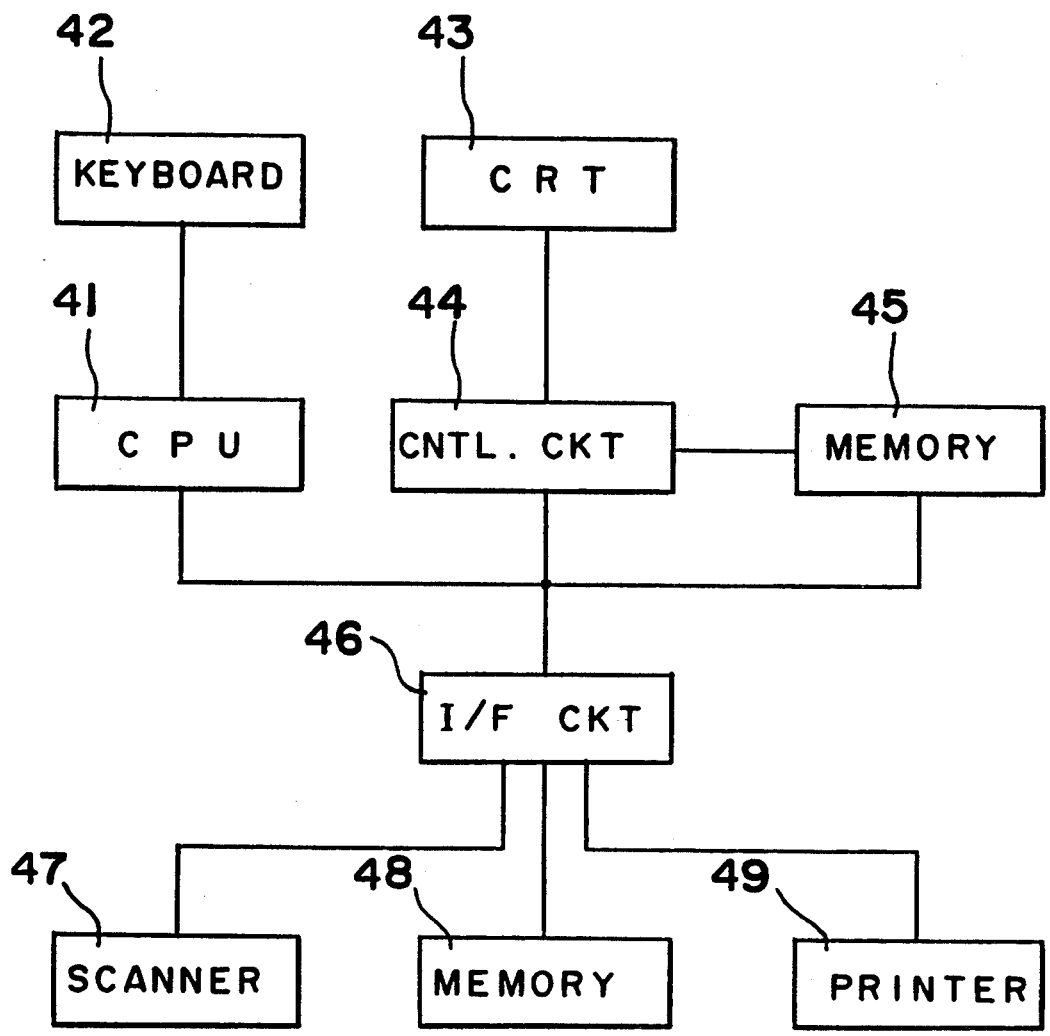
FIG. 8 is a block diagram showing an information registering apparatus of a fourth embodiment of the invention.

FIG. 8 is a block diagram showing one form of an information registering apparatus embodying the present invention. In FIG. 8, numeral 41 designates a CPU which controls a secondary information setting operation of the apparatus; 42 is a keyboard for inputting symbols (including characters) used to properly designate pieces of secondary information; 43 is a CRT (cathode ray tube) which displays a list of selected keywords, etc.; 44 is a control circuit for controlling units such as the CRT 43 and a memory 45 which temporarily stores therein information such as that retrieved during a keyword retrieving operation; 48 is a memory device having areas such as a register area for registration of information and a memory area for storage of keywords; 47 is a scanner for use in connection with information reading and inputting, etc.; and 49 is a printer for use in connection with information outputting, etc. The scanner 47, the memory device 48, and the printer 49 are connected through an interface circuit 46 to the CPU 41, the control circuit 44, and the memory 45.

The memory area of the memory device 48 stores therein itemized keywords which define pieces of secondary information to be annexed to information registered in the register area.

Figure 9:
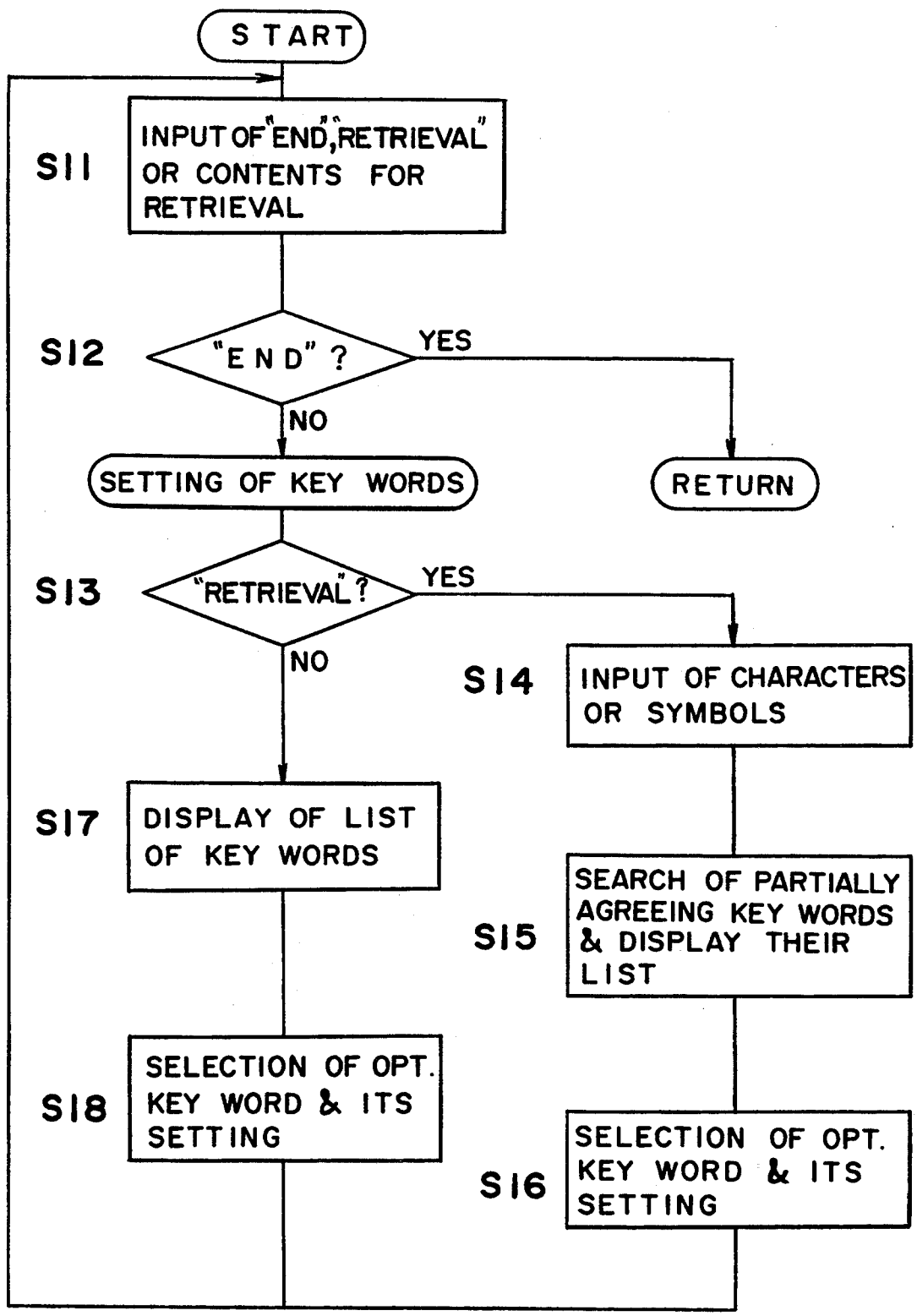
FIG. 9 is a flow chart of a secondary information setting operation of the fourth embodiment.

In the secondary information setting operation by the information registering apparatus, when a symbol or the like which properly designates secondary information for attachment to information to be registered is inputted from the keyboard 42, the CPU 41 controls individual units through the control circuit 44 to retrieve defined keywords which partially agree with the inputted symbol. This process of the secondary information setting will now be explained with reference to a flow chart shown in FIG. 9.

At step S11, one of the following is selected for input: secondary information items, operation ending ("END"), and retrieving ("RETRIEVAL"). When any secondary information item is required to be selected, the cursor is moved to a corresponding position on the CRT 43 and the contents for the selected item are inputted. When the ending or the retrieval operation is required, "END" or "RETRIEVAL" is inputted. If a keyword list for selecting a keyword for a specified item is required to be displayed without carrying out a retrieval operation, the title of the desired item is inputted, as conventionally done. When the keyword list is required to be obtained through the retrieval process, "RETRIEVE" is inputted from the keyboard.

At step S12, it is determined whether the input made at step S11 is "END" or not. If "END" has been inputted, the retrieval is terminated. If not, the program proceeds to step S13 where a keyword setting operation is performed.

At step S13, it is determined whether the input made at step S11 is "RETRIEVE" or not. If it is determined "RETRIEVE" has been inputted, the program proceeds to step S14. If not, the program proceeds to step S17.

At step S14, characters or symbols which properly designate secondary information required for execution of the retrieval are inputted from the keyboard 42 and stored in the memory 45.

At step S15, a retrieval is carried out to check that the characters or symbols inputted and stored in the memory 45 at step S14 are in at least partial agreement with defined keywords stored in the memory area of the memory device 48; and keywords which are at least in partial agreement with the characters or symbols are selected and a list of the selected keywords is displayed on the CRT 43.

At step S16, out of the keywords in the keyword list, a keyword which appears to an operator to be most appropriate is selected and inputted. Then, the inputted keyword is set at a given position in the information that is going to be registered, and is registered in the register area of the memory device 48 accordingly. Subsequently, the program returns to step S11.

At step S17, a list of keywords corresponding to the secondary information items inputted at step S11 is displayed on the CRT 43.

At step S18, out of the keywords in the displayed list, a most appropriate keyword is selected and inputted. Thereupon, the inputted keyword is set at a given position in the information which is going to be registered, and is registered in the register area of the memory device 48. Then, the program returns to step S11.

As above explained, in the secondary information setting operation carried out by the apparatus of this embodiment, the retrieval process is carried out in such a way that defined keywords are searched out which are in partial agreement with symbols or characters that are properly descriptive of the inputted secondary information, the keywords so searched out being displayed. Therefore, a list displayed can consist of only those keywords selected from among the defined keywords which can properly represent the secondary information to be attached to primary information. Owing to this function of the apparatus, even an operator without any idea as to what keywords are stored in the memory area could quickly select optimum keywords descriptive of the secondary information to be attached to the corresponding primary information.

In the secondary information setting operation, the retrieval may be carried out after putting restriction on the secondary information items in number, instead of the selection of the retrieval at step S11. Thereby time required for the retrieval of partially agreeing keywords can be reduced.

As is clear from the above description, according to the present invention, the retrieval is carried out so as to pick out defined keywords stored in a memory area that are in partial agreement with a character or symbol indicative of secondary information which is inputted through the input device by an operator, and such keywords in partial agreement with the character or symbol are displayed on the display unit. Therefore, anybody can quickly select from the displayed list of keywords an optimum keyword indicative of the secondary information to be applied.

Fifth Embodiment

Figure 10:
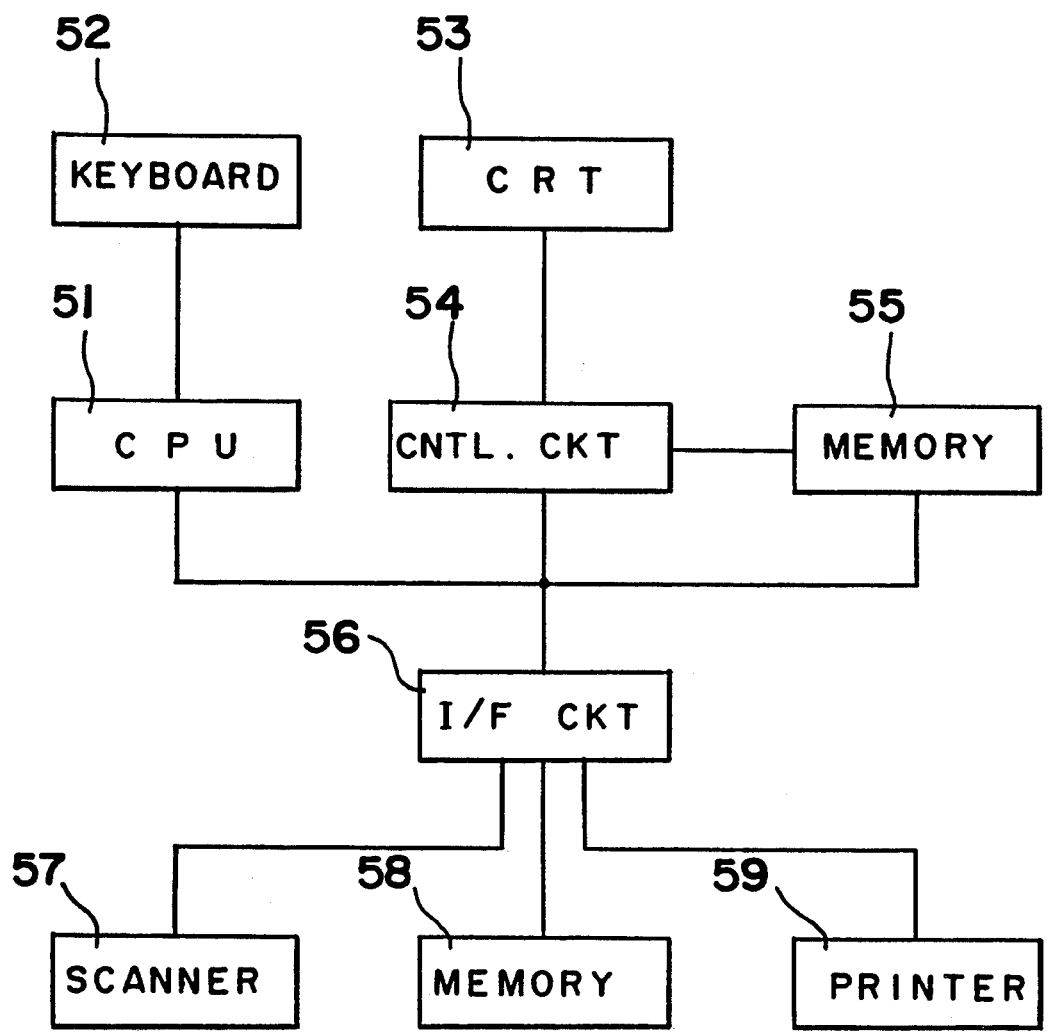
FIG. 10 is a schematic block diagram showing an electronic file of an information registration retrieval apparatus representing a fifth embodiment of the invention.

FIG. 10 is a schematic block diagram showing one form of an information registration retrieval apparatus embodying the invention. In FIG. 10, numeral 51 designates a CPU having registration means (which means will hereinafter be described) which controls the entire apparatus according to programs to perform registration and retrieval of information; 52 is a keyboard for manually inputting various commands and data such as secondary information; 53 is a CRT which displays on a screen various pieces of primary information consisting of image information and pieces of secondary information including keywords for retrieval of the primary information; 54 is a control circuit which controls display on the CRT 53; 55 is a memory which temporarily stores information to be displayed on the CRT 53; 56 is an interface circuit which interconnects the CPU 51 and peripheral units; 57 is a scanner utilized as an input device which reads out documents and converts the same into image information; 58 is a memory device consisting of a photomagnetic disk which stores therein primary information with secondary information attached thereto; and 59 is a printer which prints out primary information retrieved onto recording paper.

The keyboard 52 is provided with a secondary information input mode key, as a switch means, for being depressed prior to key inputting of secondary information. The CPU 51 operates to cause the memory device 58 to register axed store therein image information or primary information inputted from the scanner 57 together with secondary information inputted from the keyboard 52 for retrieval of the primary information; and it also performs retrieval of the memory device 58 for information matching retrieval conditions inputted by way of secondary information from the keyboard 52 and causes results of the retrieval to be displayed on the CRT 53. These functions are not different from those usual with the prior art. The registration means of the CPU 51 is of such arrangement that when a push-down signal from the secondary information input mode key of the keyboard 52 is received prior to or in the course of scanning and input of primary information by the scanner 57 (see steps S3, S6 in FIG. 11), secondary information inputted from the keyboard is temporarily stored in the memory 55 as so required and, only after scanning and input of primary information is completed (see step S7 in FIG. 11), the temporarily stored latest secondary information is attached to the scanned and inputted primary information and the primary information with the secondary information attached thereto is caused to be stored in the memory means 58 (see step S8 in FIG. 11).

Figure 11:
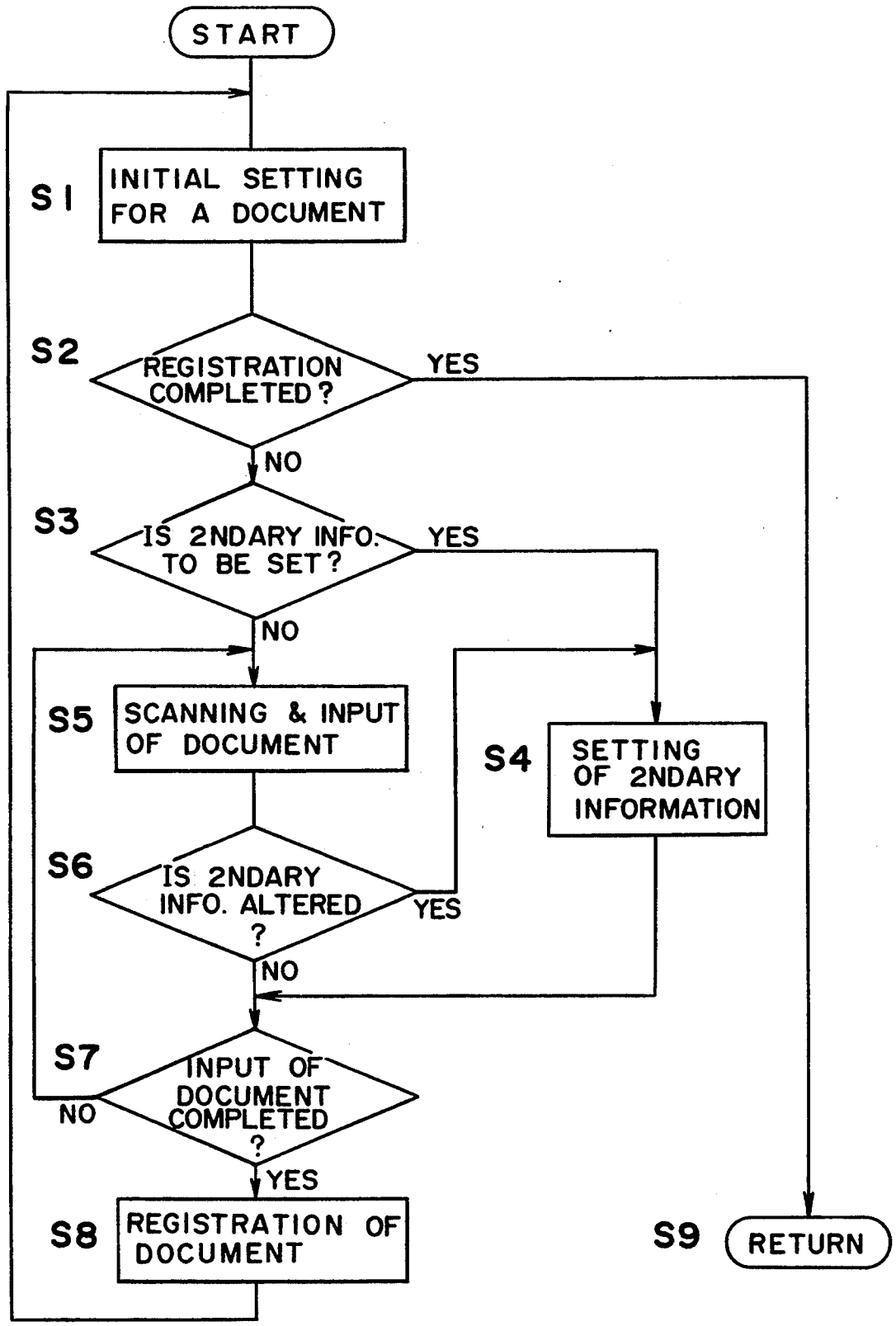
FIG. 11 is a flow chart showing the process of information registration with the electronic file.

Information registering operation of the present embodiment of such arrangement will now be described with reference to the flow chart of FIG. 11.

At step S1, initial data, such as secondary information, relative to primary information to be registered is inputted from the keyboard 52. At step S2, according to the ON/OFF state of the registration mode key, a decision is made as to whether registration is to be continued or is completed. If the decision is "to be continued", the program proceeds to step S3. At step S3, the registration means of the CPU 51 determines whether secondary information setting is necessary or not according to an ON/OFF state of the secondary information input mode key, and if the decision is "necessary", the program proceeds to step S4 at which secondary information inputted at step S1 or secondary information inputted again from the keyboard 52 is set as information to be attached to the primary information and is temporarily stored in the memory 55, while if the decision is "NO", the program proceeds to steps S5 to S7 which constitute a loop of scanning and inputting by the scanner 57 of primary information extending over a plurality of pages. At step S6 of this loop, the registration means of the CPU 51 decides whether secondary information setting is necessary or not according to an ON/OFF state of the secondary information input mode key in the same way as at step S3, and if the decision is "necessary", the program proceeds to step S4 at which secondary information inputted newly from the keyboard in the course of the scanning and inputting loop being executed is stored in the memory in place of the secondary information temporarily stored therein, whereby a secondary information change is effected. At step S7, if it is determined that there is no residual page of the document, the program exits from the scanning and inputting loop and proceeds to step S8. At step S8, when the registration key on the keyboard is pushed by the operator, the secondary information which has been temporarily stored is attached to the scanned and inputted primary information, and the primary information, with the secondary information attached thereto, is stored and registered in the memory device 58. Upon completion of registration of one document, the program returns to step S1 for repetition of the same registration process for a next document. When, at step S2, it is determined that registration is completed, the program proceeds to step S9, whereupon the registration operation is terminated.

As above described, according to the present embodiment, the operator can input secondary information to be attached to primary information by using the secondary information input mode key and the keyboard 52, whenever he so desires, prior to or in the course of primary information scanning and inputting, and cause the inputted primary information, with the latest inputted secondary information added thereto, to be stored in the memory device 58. Therefore, it is now possible to alter and/or amend secondary information during the process of primary information scanning and inputting, which has been not possible with the prior art arrangement. This can considerably save labor end time involved in correction of any erroneous registration and permits efficient and easy registration of documents. Further, the above explained secondary information inputting at steps S6 and S4, that is, secondary information inputting in the course of primary information scanning and inputting, includes, in a broad sense, secondary information inputting at a point of time when scanning end inputting of secondary information is completed, and therefore it is possible to input secondary information to be added to primary information after the primary information is scanned and inputted.

It is needless to say that the information registration retrieval apparatus of the invention is not limited to the embodiment shown.

As is apparent from the above description, this information registration retrieval apparatus of the invention comprises switch means which actuates an input unit for inputting secondary information, and registration means which receives signals from the switch means, whereby secondary information inputted through the input unit as required prior to or in the course of primary information scanning and inputting is attached to the inputted primary information and the primary information, with the secondary information attached thereto, is caused to be stored in the memory device. Therefore, according to the invention, it is now possible to alter and/or amend secondary information during the process of primary information scanning and inputting, which has been not possible with the prior art arrangement. This can considerably save labor and time involved in correction of any erroneous registration and permits efficient and easy registration of documents.

Sixth Embodiment

Figure 12:
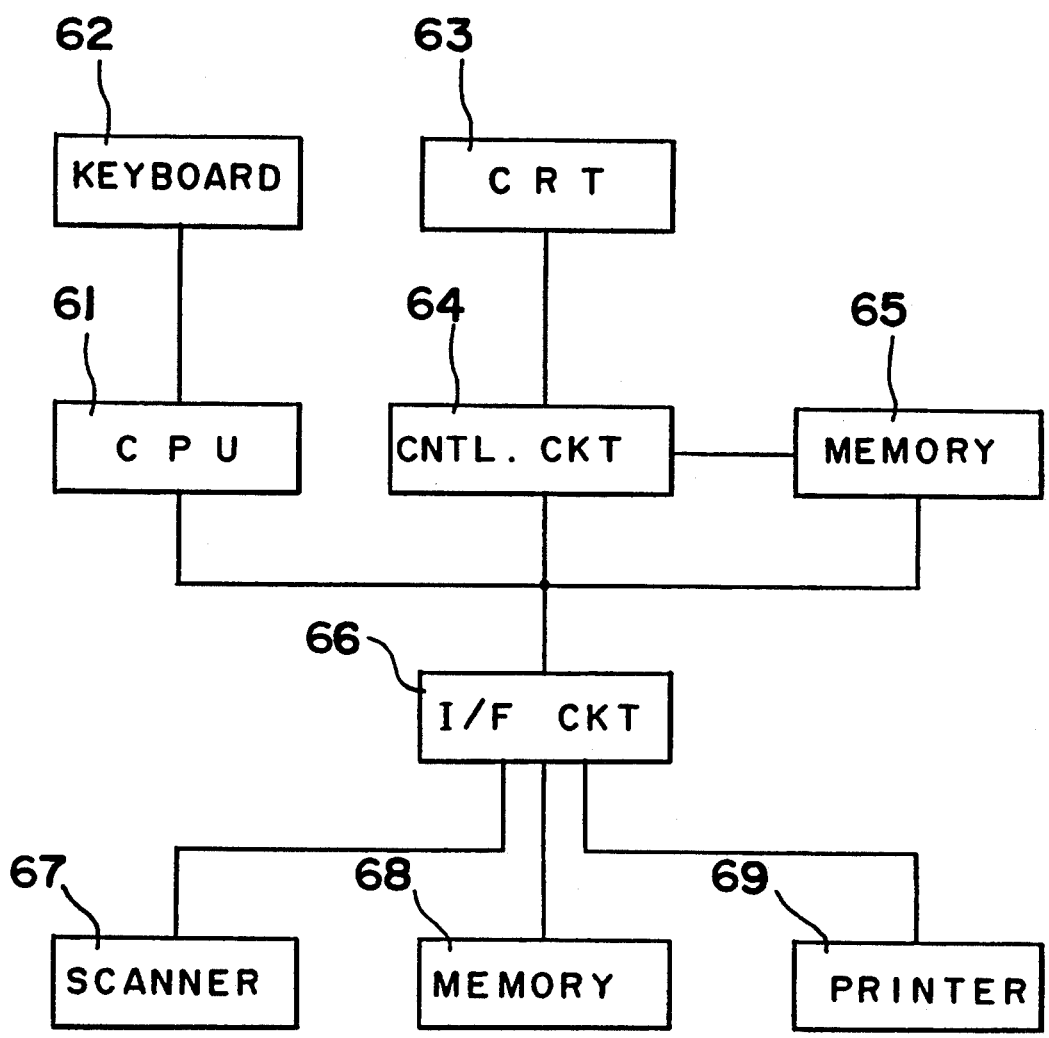
FIG. 12 is a schematic block diagram showing an electronic file of an information registration retrieval apparatus representing a sixth embodiment of the invention.

FIG. 12 is a schematic block diagram showing another form of an information registration retrieval apparatus embodying the invention. In FIG. 12, numeral 61 designates a CPU which controls the entire apparatus according to a program to perform registration and retrieval of information; 62 is a keyboard for manually inputting various commands and data; 63 is a CRT which displays on a screen primary information consisting of image information, secondary information consisting of keywords and the like for retrieval of the primary information, and guidance information for secondary information setting; 64 is a control circuit which controls display on the CRT 63; 65 is a memory which stores therein a plurality of latest pieces of secondary information of those pieces of secondary information which are sequentially inputted from the keyboard 62 and also pieces of information to be displayed on the CRT 63; 66 is an interface circuit which interconnects the CPU 61 and peripheral units; 67 is a scanner utilized as an input device which reads a document and converts the same into image information; 68 is a memory device consisting of a photomagnetic disk which stores therein pieces of primary, secondary, and guidance information; and 69 is a printer which prints out searched-out primary information on recording paper.

The keyboard 62 is provided with a secondary information call key for instructing read-out of the plurality of pieces of secondary information stored in the memory 65. The CPU 61 operates to attach to image information or primary information inputted from the scanner 67 secondary information, such as keywords, inputted from the keyboard 62 for retrieval of the primary information, and causes the primary information, with the secondary information attached thereto, to be registered and stored in the memory device 68, while it performs a retrieval of the memory device 68 for secondary information conforming to retrieval conditions inputted as secondary information from the keyboard 62 and reads out the same for display on the CRT 63. Further, for the purpose of setting secondary information for attachment to primary information, the CRT 63 operates to display on the CRT 63 guidance information for such secondary information setting and a list of pieces of secondary information matching individual items of the guidance information. These functions of the CRT 63 are same as those of CPU in prior art electronic files. Further, the CPU 61 reads out a plurality of pieces of secondary information (e.g., 8 pieces) from the memory 65 in response to an instruction from the secondary information call key of the keyboard 62 and causes the same to be displayed on the CRT 3, and registers, together with the primary information, any such one of the plurality of pieces of secondary information as may be specified by the operator through a cursor key of the keyboard 62. Storing of the latest 8 pieces of secondary information into the memory 65 is also carried out by the CPU 61.

A secondary information setting operation of the information registration retrieval apparatus of the above arrangement will now be explained with reference to a flow chart shown in FIG. 13.

At step S1, when guidance information consisting of, for example, title, author, date of publishment, and the like, for secondary information setting is displayed on the screen of a display, the operator moves a cursor to the position of a desired item, for example, "author" on the screen by using a cursor key. The CPU 61, at step S2, determines whether or not the secondary information setting has been executed by ON/OFF operation of a secondary information setting mode key on the keyboard, and if it determines that it has, the CPU 61 goes into secondary information setting operation at step S3. Next, at step S4, if it is determined that the secondary information call key of the keyboard 62 is in its off-position, the program proceeds to step S6, judging that secondary information to be attached to primary information should be selected from information stored in the memory device 68. At step S6, the CPU 61 causes a list of pre-defined secondary information, such as name of author, etc., to be displayed on the screen of the display, which information is to be set to the item "author", for example, if the cursor is now at the "author" position; and the operator selects and specifies a desired author name from the list by using the cursor or the like means. At step S7, an enter key or the like is pressed, and a selected author name is set to the item "author"; and program proceeds to step S8.

When the secondary information call key is in the on-condition, at step S4, it is determined that secondary information to be attached to primary information should be selected from the latest 8 pieces of secondary information stored in the memory 65, and program proceeds to step S5. The CPU 61 reads out the 8 pieces of secondary information from the memory 65 and causes the same to be displayed on the screen of the CRT 63, and the operator selects and specifies a desired piece of secondary information out of them by using the cursor key of the keyboard 62. At step S7, when the enter key is pressed, and author name, for example, selected as secondary information is set to the item "author" of the guidance information set at step S7. At step S8, the secondary information set at step S7 is stored as one of the 8 pieces of secondary information in the memory 65 in a region corresponding to the particular item, for example, in "author" region in the case of secondary information consisting of author, name, and "title" region in the case of secondary information consisting of "title". Subsequently, the program returns to step S1 and secondary information is set to a next item (for example, "title") of the guidance information displayed on the screen in the same manner as previously done. In this way, individual pieces of secondary information are sequentially set in position. At step S2, if it is determined that the secondary information setting mode key is in the off-condition, the secondary information setting operation terminates. Finally, though not illustrated in the flow chart, the CPU 61 adds the set secondary information to the primary information scanned and inputted by the scanner 67, and causes them to be stored and registered in the memory device 68.

Figure 13:
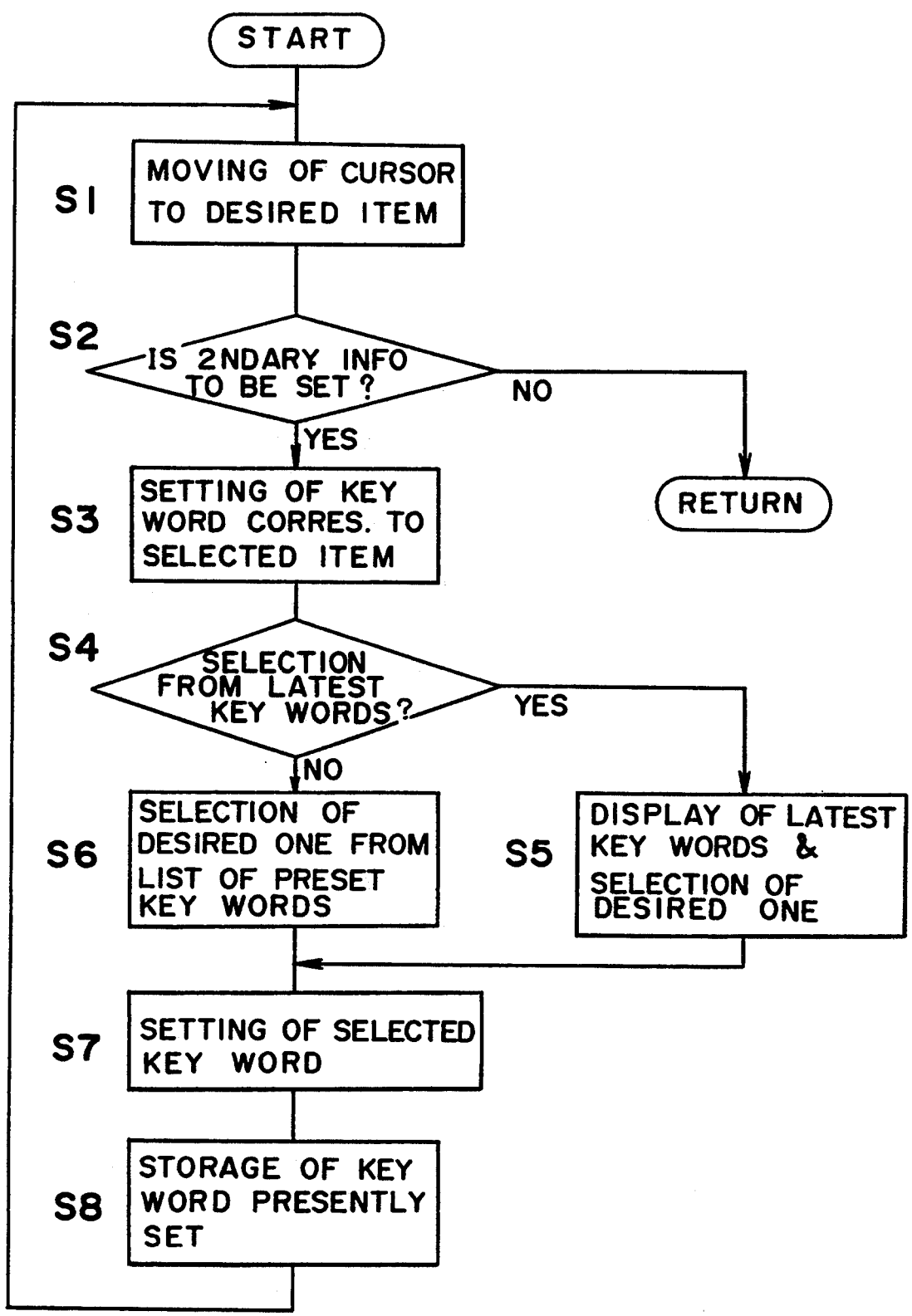
FIGS. 13 and 14 are flow charts showing the process of secondary information setting operation with the electronic file of FIG. 12.
Figure 14:
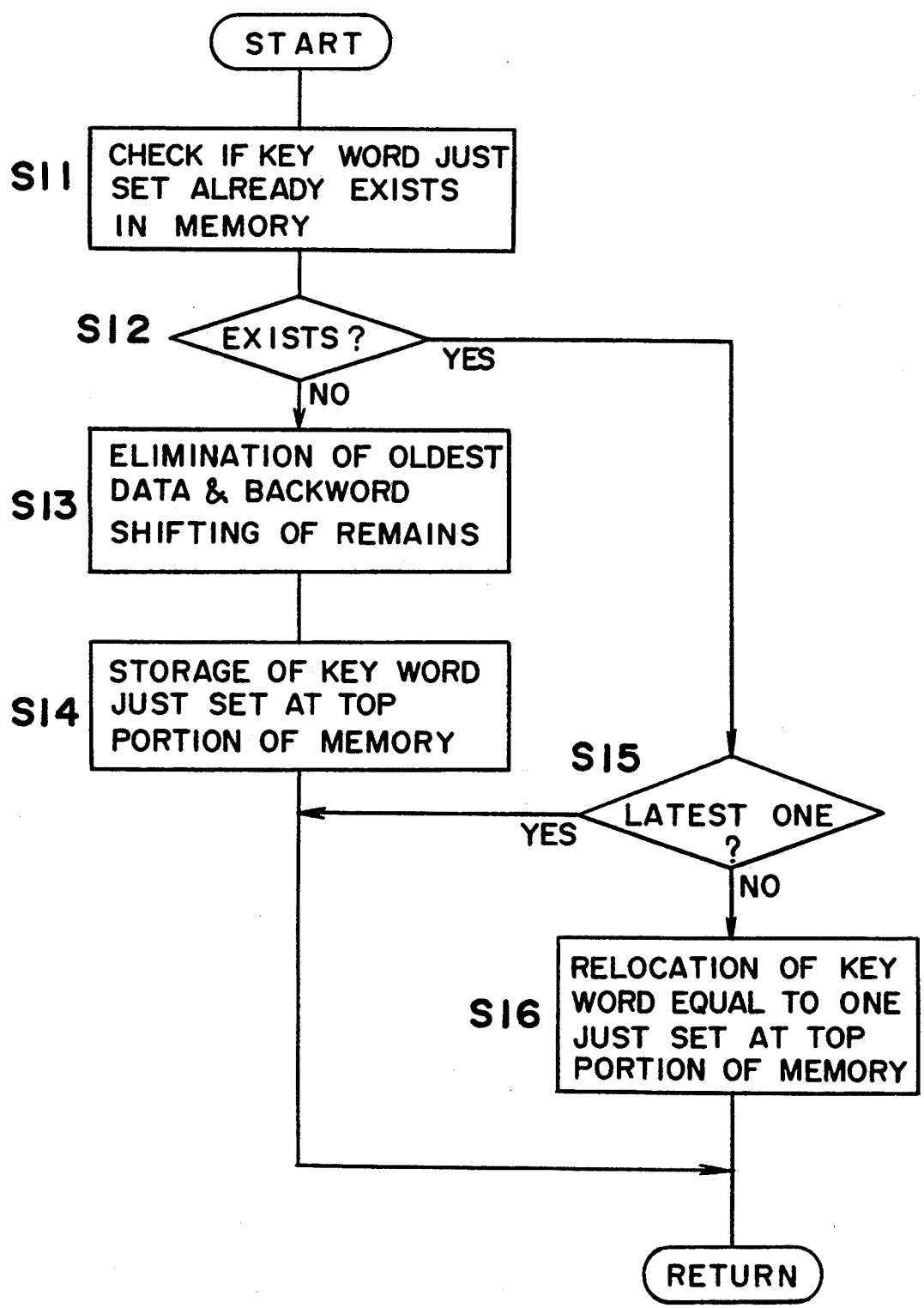

FIG. 14 is a flow chart showing a subroutine for storing secondary information newly in the memory 65, which corresponds to step S8 in FIG. 13. When this subroutine starts, the CPU 61, at step S11, checks whether or not the secondary information just set is present in the memory 65. At ! . step S12, if it is determined that it exists in the memory 65, the CPU 61 proceeds to step S15. If the decision is "NO", the CPU 61 branches to step S13. At step S13, in order to store said secondary information newly in memory, the CPU 61 eliminates the oldest secondary information in the memory 65 and shifts other pieces of secondary information, one each, backward. At step S14, the CPU 61 causes the new secondary information to be stored in the memory at a top portion thereof. Then, it returns to the main routine. While, at step S15, it is determined whether said new secondary information is at the top portion of the memory; if it is at the top, the CPU 61 returns immediately to the main routine, and if not, the CPU 61 proceeds to step S16. At step S16, the new secondary information is relocated to the top portion of the memory 5 so as not to cause any change in the priority order of other pieces of secondary information. Thereafter, the CPU 61 returns to the main routine.

In this way, according to the arrangement of the present embodiment, where many pieces of primary information, with similar secondary information attached thereto, are registered in memory, there is required no trouble to repeat selection of the same secondary information from a list showing all pieces of secondary information, it being possible to quickly select a desired piece of secondary information from the memory 65 in which only the 8 latest pieces of secondary information are stored. The so selected pieces of secondary information can be efficiently registered by being attached to corresponding pieces of primary information. Thus, needless to say, the arrangement of the invention provides greater ease of operation. Furthermore, according to the above described embodiment, the latest secondary information set by the CPU 61 is stored at top the portion of the memory 65, and therefore selection by the cursor of secondary information having higher frequency of use can be efficiently made.

The number of pieces of secondary information stored in the memory is not limited to eight, though it is shown, by way of example, as 8 in the present embodiment. Again, needless to say, the invention is not limited to the embodiment.

As is apparent from the above description, according to the arrangement of the invention, of various pieces of secondary information sequentially inputted from the input unit for attachment to primary information, a plurality of the latest ones only are stored in the memory, and the plurality of pieces of secondary information are read out from the memory in accordance with an instruction from the secondary information call key and are caused to be displayed on the screen of the display, so that secondary information selected and specified by the operator out of the plurality of pieces of secondary information is attached to the primary information end registered together with the primary information in the memory. Therefore, in the case where many pieces of primary information, with similar secondary information attached thereto, are registered in memory, there is required no such trouble to repeat selection of the same secondary information from a list showing all pieces of secondary information as has been the case with the prior art, it being thus possible to quickly select a desired piece of secondary information from the memory and to cause it to be attached to the primary information and efficiently registered in memory. Thus, greater ease of operation can be achieved.

Seventh Embodiment

Figure 15:
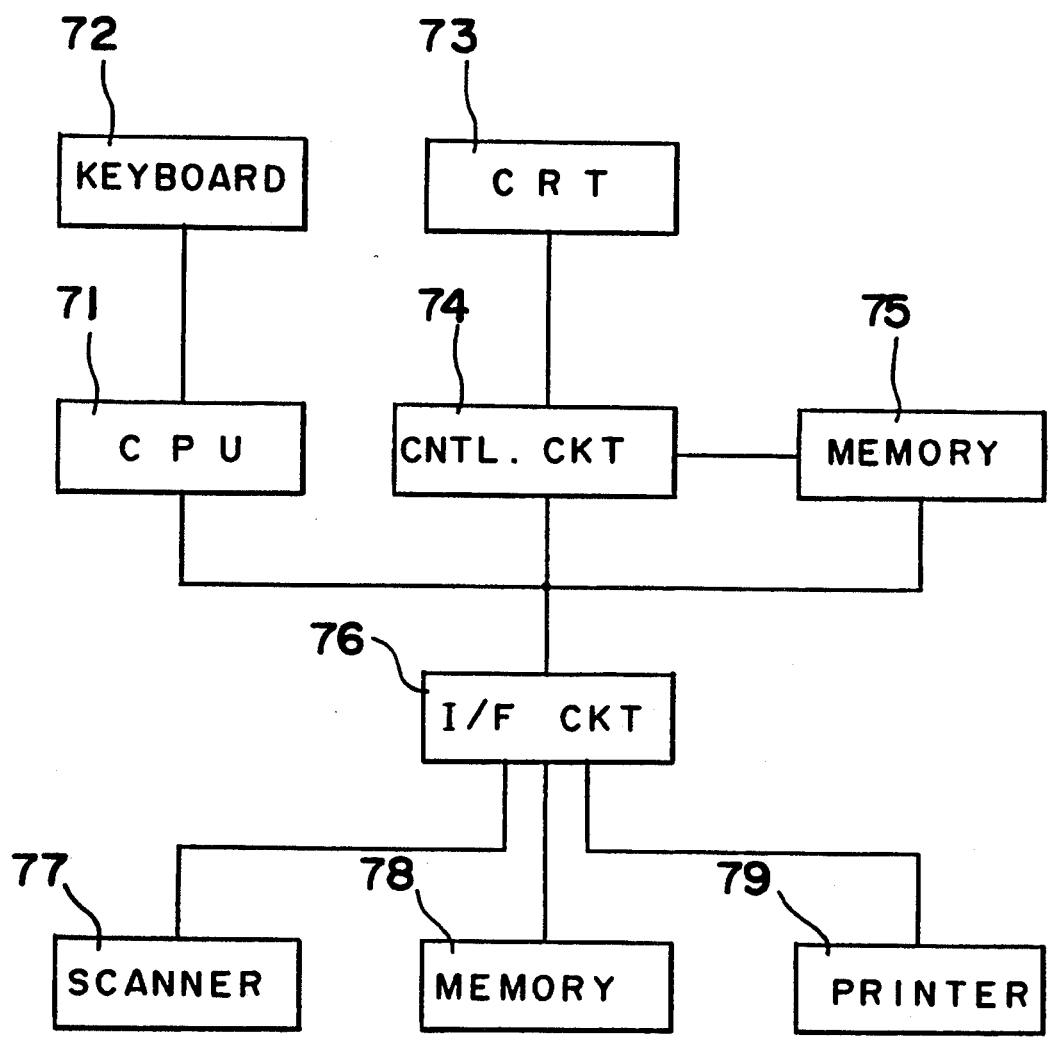
FIG. 15 is a schematic block diagram showing an electronic file of an information registering apparatus representing a seventh embodiment of the invention.

FIG. 15 is a schematic diagram showing another form of an information registration retrieval apparatus embodying the invention. In FIG. 15, numeral 71 designates a CPU which controls the entire apparatus according to a program to perform registration and retrieval of information and which has secondary information write means and secondary information read-out means, both of which means will hereinafter be described; 72 is a keyboard for manually inputting various commands and data such as secondary information; 73 is a CRT which displays on a screen primary information consisting of image information, secondary information consisting of keywords for retrieval of primary information, and guidance information for secondary information setting; 74 is a control circuit which controls display on the CRT 73; 75 is a memory for storing therein secondary information manually inputted from the keyboard 72 and information to be displayed on the CRT 73; 76 is an interface circuit which interconnects the CPU 71 and peripheral units; 77 is a scanner which reads a document and converts the same into image information; 78 is a memory device consisting of a photomagnetic disk for storing therein primary information with secondary information attached thereto; and 79 is a printer which prints out searched primary information on recording paper.

The keyboard 72 is provided with a secondary information call key for instructing read-out of secondary information from the memory 75, a secondary information write key for instructing writing of secondary information manually inputted into the memory 75, and a registration key for storing primary information with secondary information into the memory device 78.

The CPU 71 operates to attach to image information or primary information inputted from the scanner 77 such secondary information consisting of keywords or the like as will be inputted from the keyboard 72 for retrieval of the primary information, and to cause the primary information with the secondary information to be registered and stored in the memory device 78, while on the other hand the CPU 71 performs retrieval and read-out from the memory device 78 of primary information matching retrieval conditions as secondary information inputted from the keyboard 72 and causes the read-out primary information to be displayed on the CRT 73. These functions are the same as those of a CPU in a conventional electronic file. The secondary information write means of the CPU 71 operates in such a way that when the secondary information write key of the keyboard 72 is pressed down at the time of manual inputting of secondary information, or when the registration key of the keyboard 72 is pushed down at the time of primary information registration, the writes means write the secondary information in a particular area in the memory 75 which is allocated to a particular item to which the secondary information belongs (such as, for example, "author" area or "title" area). The secondary information read-out means of the CPU 71 operates in such a way that when the secondary information call key is depressed, the read-out means reads out from the memory 75 a piece of secondary information corresponding to a presently selected item of guidance information and causes the secondary information to be displayed on the screen of the CRT 73 at a specified position for the item. At the same time, the read-out means set the secondary information as a piece of secondary information to be attached to the primary information.

The secondary information setting and primary information registering operations of the above described information registration retrieval apparatus will now be explained with reference to the flow charts shown in FIGS. 16 to 18.

Figure 16:
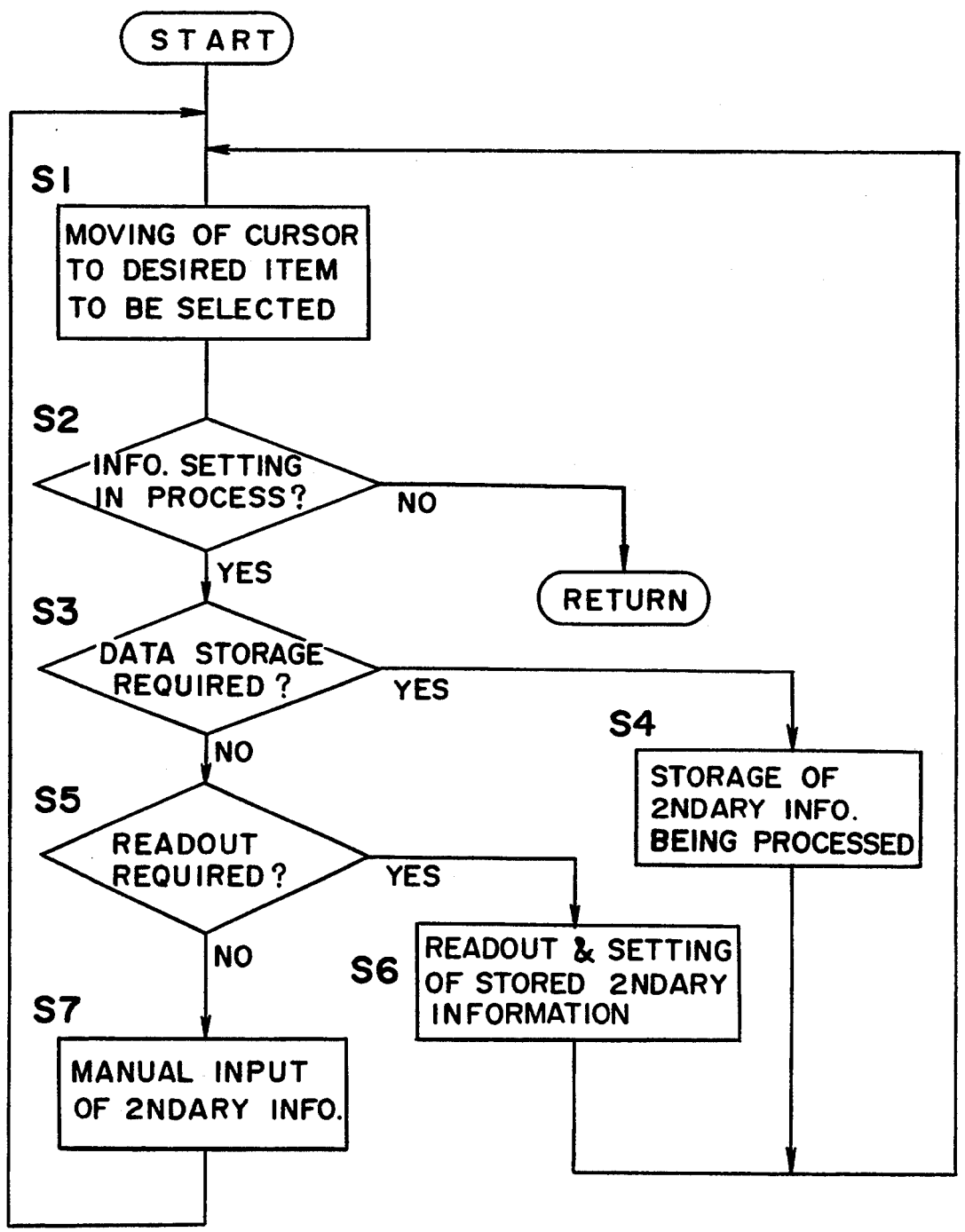
FIGS. 16, 17, and 18 are flow charts showing the process of secondary information setting with the electronic file of FIG. 15.

FIG. 16 shows by way of example the process of secondary information setting by use of the above described apparatus.

When a secondary information setting key is depressed, guidance information is displayed on the screen of the CRT 73 at step S1. The operator moves the cursor to a desired item to be selected for secondary information setting. At step S2, "CONTINUE" or "END" of setting operation is determined according to an ON/OFF condition of the secondary information setting key. If the decision in "CONTINUE", the CPU 71 proceeds to step S3. At step S3, the CPU 71 determines whether writing of secondary information into the memory 75 is necessary or not, according to an ON/OFF condition of the secondary information write key. If "necessary", the CPU 71 proceeds to step S4, at which the secondary information write means stores secondary information being processed in the memory. Then, the CPU 71 returns to step S1. If not "necessary", the CPU 71 proceeds to step S5. At step S5, the CPU 71 determines whether read-out from the memory 75 is necessary or not. If "necessary", the CPU proceeds to S6, at which secondary information stored in the memory 75 is read-out by the secondary information read-out means and is caused to be displayed on the screen of the CRT 73 in desired item column of guidance information, the secondary information being then set as secondary information to be attached to primary information. Subsequently, the CPU 71 returns to step S1. If read-out is not necessary, the CPU 71 proceeds to step S7. Step S7 is a step for secondary information manual input, at which step S7 the operator inputs secondary information for entry in a desired item column of guidance information by using character keys or the like on the keyboard 72. Subsequently, the program returns to step S1.

Thus, secondary information that has previously been stored in the memory 75, is automatically set as new secondary information via step S6 or manually set as new secondary information via step S7. Again, at step S1, following a similar procedure, secondary information is inputted and set to a next item of guidance information selected through cursor movement. This process is repeated until pieces of secondary information are set to all required items. When the secondary information setting key goes into an off-condition, the decision at step S2 is "NO", whereupon the process of secondary information setting terminates. The secondary information thus set is attached to primary information (e.g., document) read by the scanner 27 at a subsequent registration step not shown, and the primary information with the secondary information is stored in the memory device 78 (e.g., a photomagnetic disk).

According to the above described embodiment, in the case where a multiplicity of pieces of primary information having similar secondary information are continuously registered, a piece of secondary information previously stored in the memory 75 via steps S3, S4 can be automatically set as new secondary information via steps S5 and S6. Therefore, the operator need not repeat input of the same secondary information time after time as has often been the case with the prior art arrangement. All that is necessary is to key-input different pieces of secondary information only at step S7. This permits very simple and prompt setting of secondary information and speedy registration of primary information with secondary information attached thereto.

Figure 17:
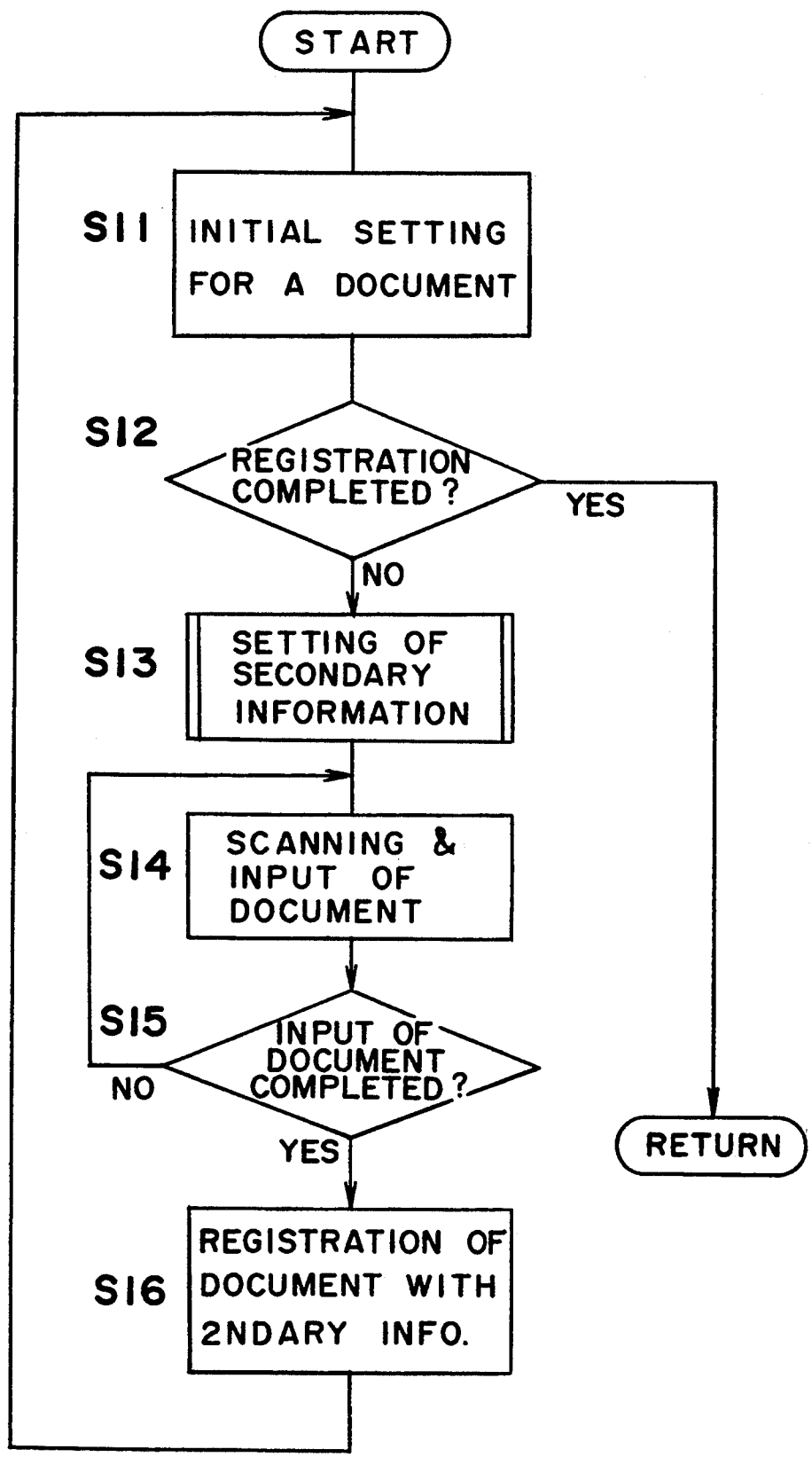

FIG. 17 is a flow chart showing a primary information registration process using the above described registration retrieval apparatus, including a modified example of secondary information setting. In the chart, step S13 is a step of secondary information setting. First, at step S11, initial data, such as secondary information, corresponding to primary information to be registered is inputted from the keyboard 72. At the next step S12, it is determined whether registration is to continue or to end, according to ON/OFF condition of the registration mode key. If the decision is "CONTINUE", the program proceeds to step S13. At step S13, secondary information setting (to be described hereinafter; see FIG. 18) is carried out. Subsequently, operation enters a loop of scanning and input by the scanner 77 of a document (primary information) consisting of a plurality of pages, which loop comprises steps S14, S15. At step S15, if the decision is that no residual page is present in the document, the CPU exits the read loop and proceeds to step S16. At step S16, when the registration key on the keyboard 72 is depressed by the operator, the secondary information set at step S13 is attached to the inputted primary information, and the primary information coupled with the secondary information is stored and registered in the memory device 78. At the same time, the secondary information write means of the CPU 71, in response to an ON signal from the registration key, causes the secondary information to be collectively stored in the memory 75. Upon completion of registration of one document, the program returns to step S11, registration of a next document (primary information) with secondary information attached thereto is repeated. At step S12, if the decision is "END", registration operation terminates.

Figure 18:
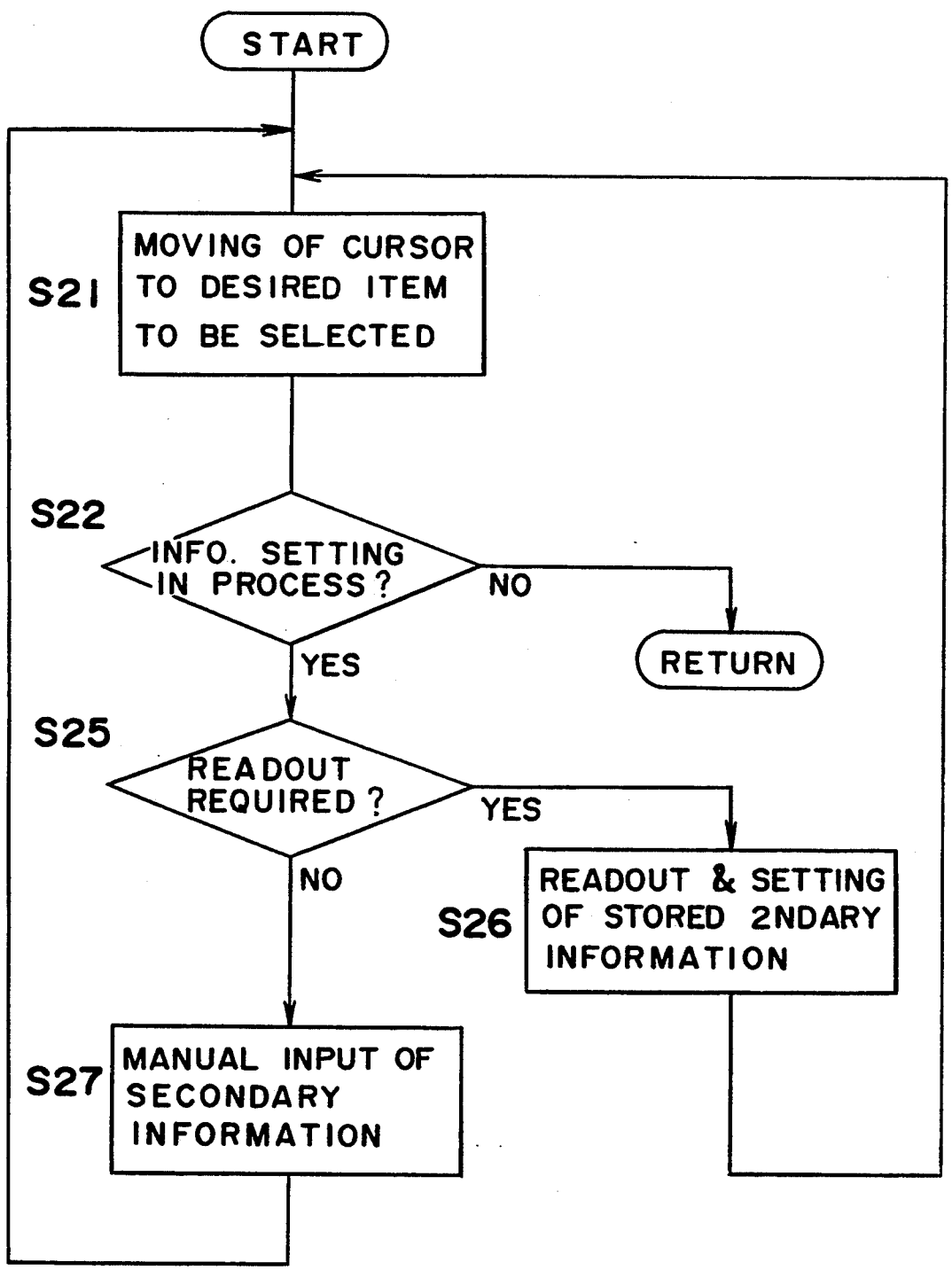

FIG. 18 is a flow chart showing a subroutine of secondary information setting shown at step S13. In FIG. 18, steps S21, S22, S25, S26, and S27 are steps for the same processing as described with respect to steps S1, S2, S5, S6 and S7 in FIG. 16. When the secondary information setting key of the keyboard 72 is depressed, the subroutine starts. At step S21, guidance information is displayed on the screen of the CRT 23 and the operator moves the cursor to a desired item to be selected for secondary information setting. At step S22, it is determined whether the setting operation is to continue or to end, according to ON/OFF condition of the secondary information setting key. If the decision is "CONTINUE", the program proceeds to step S25. At step S25, the CPU 71 determines whether read-out from the memory 75 is necessary or not according to an ON/OFF condition of the secondary information call key. If "necessary", the CPU 71 proceeds to step S26, at which the secondary reads-out means read-out the secondary information stored in the memory 75 and causes the same to be displayed on the CRT 73 in the column of a presently selected item of guidance information. The secondary information is set as such for attachment to the primary information. Then, the CPU 71 returns to step S21. If the decision is that read-out is unnecessary, the CPU proceeds to step S27. After manual input of secondary information is effected, the CPU returns to step S21. The same procedure as has been followed is repeated for secondary information setting to a next item of the guidance information. This process is repeated until the secondary information setting key is brought to an OFF position. Then, at step S22, the decision "NO" is given, whereupon the secondary information setting operation terminates and the program returns to main routine.

The above described modified embodiment is different from the FIG. 16 embodiment in that secondary information writing (steps S3, S4) is omitted. Writing of secondary information into the memory 75 is automatically carried out collectively during registration operation at step S16 in FIG. 17. Therefore, as is the case with the FIG. 16 embodiment, the modified embodiment of FIG. 18 permits easy and quick secondary information setting and also permits speedy registration of primary information. Further, it is more advantageous than the FIG. 16 embodiment in that it eliminates the trouble of pressing the secondary information write key each time and thus provides greater simplicity in operation procedure.

As is apparent from the above description, the present embodiment of the information registration retrieval apparatus according to the invention operates in such a way that secondary information manually inputted for addition to primary information is stored in the memory by the secondary information write means which receives a write command from the operator at the time of manual inputting or a registration command from the operator at the time of primary information registration, and the secondary information stored in the memory is read-out by the secondary information read-out means which receives an instruction from the operator through the secondary information call means and is caused to be displayed on the screen of the display unit and set as secondary information to be attached to the primary information. Therefore, when many pieces of primary information having similar information are to be successively registered, previous pieces of secondary information stored in the memory can be read-out and set immediately. This eliminates the trouble of such key inputting of same secondary information each time as has been the case with the prior art arrangement, and thus enables simplified and more efficient registration operation with respect to primary information.

Eighth Embodiment

Figure 19:
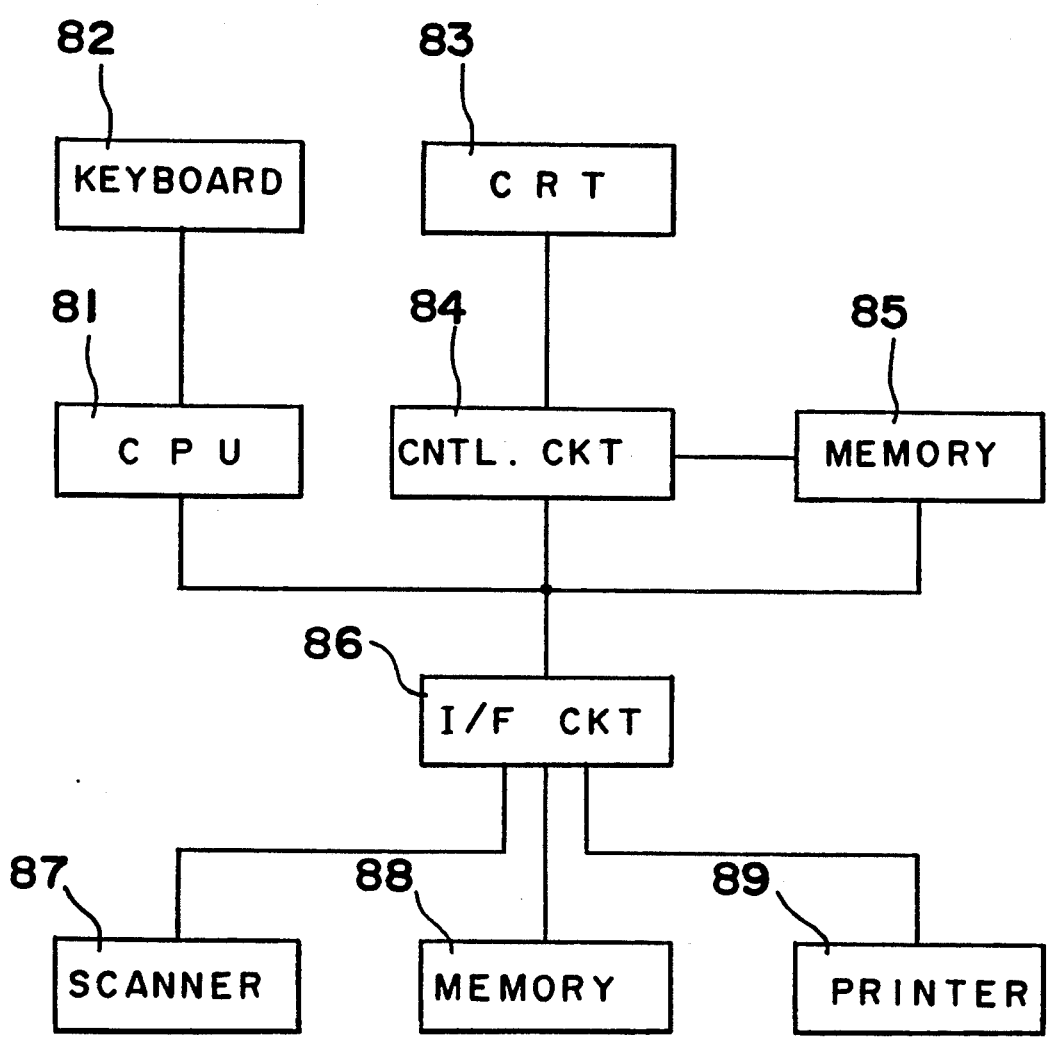
FIG. 19 is a schematic block diagram showing an electronic file of an information registration retrieval apparatus representing an eighth embodiment of the invention.

FIG. 19 is a schematic block diagram showing another form of an information registration retrieval apparatus embodying the invention. In FIG. 19, numeral 81 is a CPU which controls the entire apparatus according to a program to perform registration and retrieval of information, and which has display holding means (to be hereinafter described), page changing means, and print control means; 82 is a keyboard for manually inputting various commands end data, 83 is a CRT which displays on a screen primary information consisting of image information, and secondary information for a retrieval of primary information; 84 is a control circuit which controls display on the CRT 83; 85 is a memory which temporarily stores therein primary information to be displayed on the CRT 83; 86 is an interface which interconnects the CPU 81 and peripheral units; 87 is a scanner utilized as an input unit which reads a document and converts the same into image information; 88 is a memory device consisting of an photomagnetic disk which stores therein primary and secondary information, etc.; and 89 is a printer utilized as an output unit which prints out searched primary information on recording paper.

The keyboard 82 is provided with a next page key and previous page key, which keys cause searched pieces of primary information of the next and previous pages to be successively displayed on the screen of the CRT 83, and is also provided with a page designating key for specifying a first page and a last page of a document or primary information having a series of pages to be outputted to the printer 89 for print out of various pieces of primary information which are successively displayed on the screen. The keyboard 82 has a print execution key for commanding output to the printer 89 of a series of pages of primary information specified by the page designating key.

The CPU 81 operates to attach to image information or primary information inputted from the scanner 87 such secondary information consisting of key words as will be inputted from the keyboard 82 for retrieval of the primary information, and cause the primary information with the secondary information to be registered and stored in the memory device 88, while on the other hand the CPU 81 performs retrieval and read-out from the memory device 88 of primary information matching retrieval conditions inputted as secondary information from the keyboard 82 and causes the read-out primary information to be displayed on the CRT 83. These functions are the same as those of a CRT in a conventional electronic file. The display holding means of the CPU 81 causes the memory 85 to store therein primary information for a page initially designated on the screen of the CRT 83 by the page designating key of the keyboard 82 (see FIG. 21 (a)), end holds the primary information as displayed on a part of the CRT 83 (see FIG. 21 (b)). The page changing means of the CPU 81 stores into the memory 85 successively pieces of primary information for pages subsequent to the initially specified page in accordance with instructions from the next page key and previous page key of the keyboard 82, and causes them to be successively displayed on the screen of the CRT 83 (see FIG. 21 (b)). The print control means of the CPU 81 is such that when a page is nextly designated on the screen of the CRT 83 by the page designating key, it outputs to the printer 89 for printing both the primary information for that page and the primary information stored in the memory 85.

The printing operation of the above described apparatus of the present embodiment will now be described with reference to a flow chart shown in FIG. 20.

At step S1, primary information (document) is searched out on the basis of the retrieval conditions inputted by way of secondary information. Then, the primary information is displayed as an image on the display at step S2. At step S3, the operator instructs through the keyboard 82 whether or not the document displayed be outputted for print out. When the document is to be printed out, at the next step S4, an instruction is given through the keyboard 82 for execution of printing one page of displayed image only or all pages of a document including the displayed image, and also print mode setting, such as number-of-prints setting, is executed. In this case, if the page designating key is being manipulated, the CPU of the apparatus determines that designation of the range of printing is not made at step S5. Accordingly, at step S6, a decision is made whether the instruction for execution of print is print out of all pages or not; and at step S7, a decision is made whether or not the instruction is one page print. If the decision is all page print, printing of all pages is executed at step S8. If the decision is one page print, printing of one page is executed accordingly at step S9. If the decision is neither all page print nor one page print, resetting of the print mode is made by the operator at step S10. Finally, at step S11, a decision is made whether or not instruction has been given by the operator through the keyboard for "printout to be ended". If yes, printing is terminated at step S2. If not, the program returns to step S4 for repetition of printing.

Figure 20:
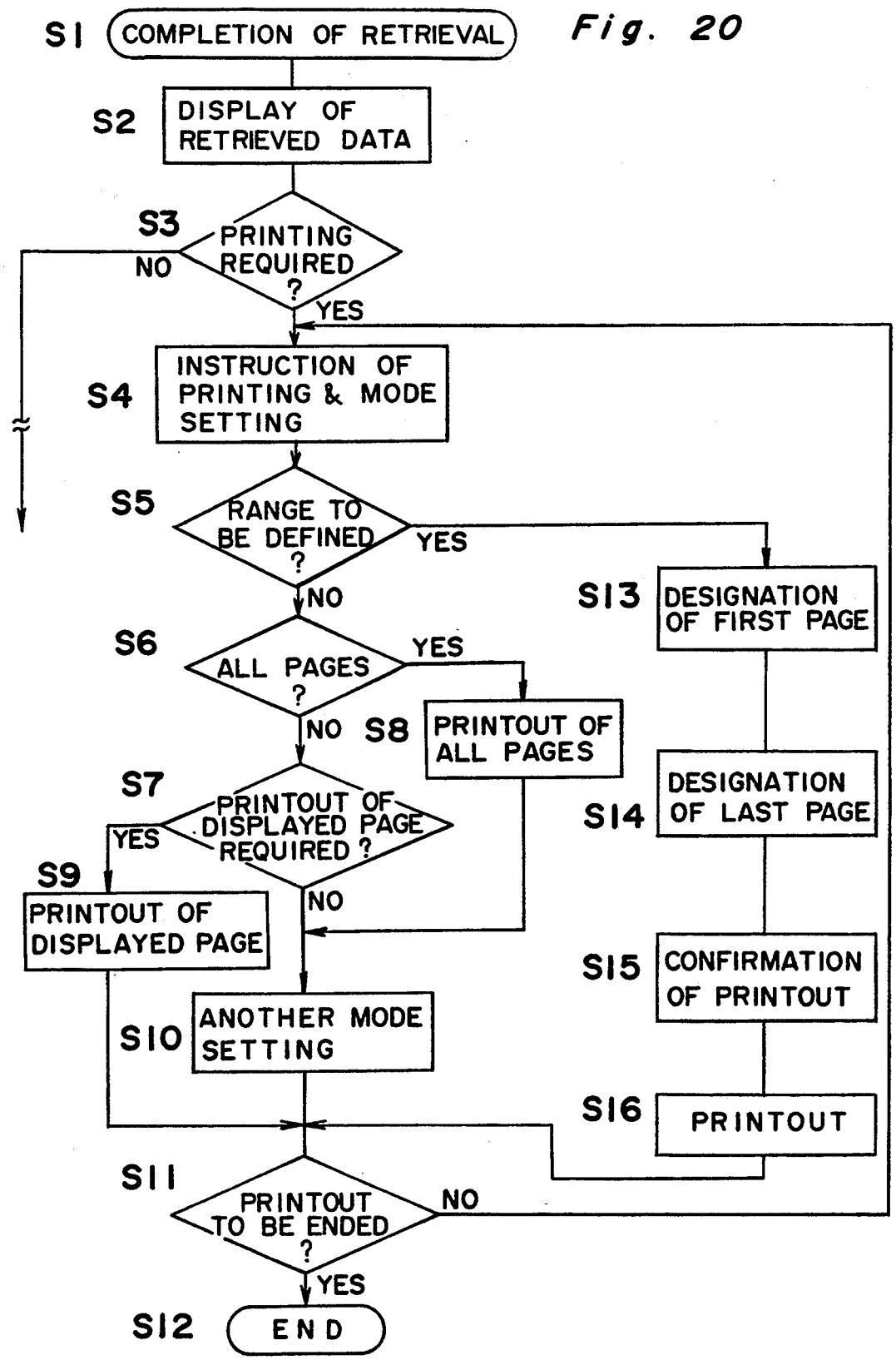
FIG. 20 is a flow chart showing the process of print mode setting with the electronic file of FIG. 19.
Figure 21A:
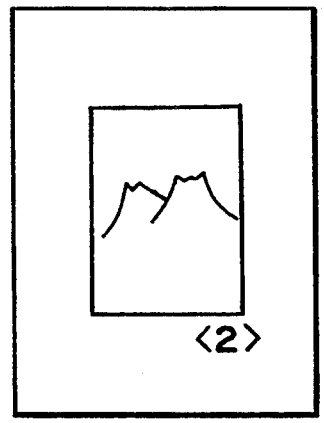
FIGS. 21 (a) and (b) are views illustrating images on display with the electronic file of FIG. 19 by way of example.
Figure 21B:
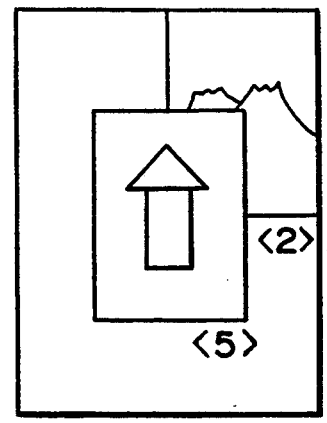

If the page designating key of the keyboard 82 is in an operating condition, at step S5 in FIG. 20, it is determined that the range for printout is to be defined, and the program proceeds to step S13. The operator causes pages of primary information to be successively displayed on the screen of the CRT 83 by using the next page key and the previous page key and, when a first page of a series of pages of primary information comes out on the screen in such a way as, for example, shown in FIG. 21 (a), that particular page is designated by means of the page designating key. Thereupon, the display holding means of the CPU 81 causes the primary information for the designated first page to be stored in the memory 85 and holds the primary information as displayed on a right top portion of the CRT 83 as shown in FIG. 21 (b). The page changing means of the CPU 81, according to an instruction from the next page key, causes primary information for a page following the first page to be stored in the memory 85 and causes the CRT 83 to display pages of primary information successively on the screen as shown in FIG. 21 (b). When a last page of the series of pages of primary information to be printed out appears on the screen of the CRT 83, the operator, at step S14, designates the last page by using the page designating key. At step S15, it is reconfirmed whether the designated series of pages of primary information may be outputted for the printout, and thereafter printout execution key is depressed. Then, the print control means of the CPU 81, at step S16, the series of pages of primary information, from the first page to the last page, are caused to be outputted to the printer 89 for printout. Upon completion of printing, the program proceeds to step S11 at which a decision is made whether or not a command has been given for printout to be ended.

As above described, according to this embodiment, a series of pages of primary information desired to be printed out can be readily specified on the screen of the CRT 83 by relating them to their image displayed, and therefore, without such trouble of repeating one page printout and without such waste of recording paper and printing time due to all page printout, as has been the case with prior art arrangement, a series of pages of primary information can be quickly and efficiently outputted for printout. Further, in the above described embodiment, there is provided a print execution key so that a series of pages of primary information designated by the page designating key are outputted for printout after it is reconfirmed that such printout may be executed; therefore, possible waste of recording paper and printing time due to erroneous printout can be eliminated.

In the above embodiment, a first page of a series of pages of primary information is first designated and then a last page is designated; but this order of page designation may be reversed. Further, it is possible that at step S4 in FIG. 20, instruction for printout to be ended may be given simultaneously and, for this purpose, decision as to printout-to-be-end or otherwise may be made immediately after this step S4.

As is clear from the above description, in this embodiment, while looking, in order of pages, pages of primary information searched out on the basis of relevant secondary information and displayed on the screen, the operator specifies, through page designating means, a first page and a last page of a series of pages of primary information to be printed out; and by display holding means, information for an initially designated page is caused to be stored in memory and is held as displayed on a portion of the display; and further, primary information for pages following the initially designated page is caused to be successively displayed on the display by page changing means so that when a page is next specified by the page designating means, primary information for that page and the primary information stored in the memory are outputted to the printer for printout. Therefore, a series of pages of primary information desired to be printed can be readily displayed on the screen of the display by relating them to their image displayed and thus they can be quickly and efficiently outputted for printout.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is.

1. A method of information retrieval and printing of primary information stored within a memory of a processing apparatus, based upon secondary information, comprising the steps of:

inputting secondary information as selected by a system user;

comparing the inputted secondary information with sets of descriptive annexed secondary information stored in the memory as annexed to respective pieces of the primary information;

retrieving one of the respective pieces of the primary information with descriptive annexed secondary information which is determined as corresponding to the inputted secondary information during said step of comparing; and printing the retrieved primary information comprising the sequential steps of scrolling various pages of the retrieved primary information manually on display means, designating and fixedly displaying a first page of the retrieved primary information manually on the display means, scrolling remaining pages of the retrieved primary information, designating and fixedly displaying additional pages of the retrieved primary information sequentially, the additional pages being displayed fixedly overlapping each other on the display means, and printing the designated pages of the retrieved primary information sequentially in order, the fixedly displayed pages reviewable prior to said substep of printing.

2. The method of information retrieval and printing of claim 1, the pages of the retrieved primary information being designated with annexed page numbers while displayed.

3. The method of information retrieval and printing of claim 2, said steps of scrolling comprising scrolling forward and backward through the retrieved primary information with respectively entered next page and previous page commands.

4. The method of information retrieval and printing of claim 3, said steps of designating further comprising storing the designated pages in the memory.

* * * * *